US012202169B2

(12) United States Patent
Phelps et al.

(10) Patent No.: US 12,202,169 B2
(45) Date of Patent: Jan. 21, 2025

(54) WOODEN TRUSS MANUFACTURING SYSTEM INCLUDING MULTIPLE PRINTERS AND METHOD

(71) Applicant: FRAMETEC ALPHA IP LLC, Phoenix, AZ (US)

(72) Inventors: Marvin M. Phelps, Cottonwood, AZ (US); Joshua A. Lewis, Prescott Valley, AZ (US)

(73) Assignee: FRAMETEC ALPHA IP LLC, Phoenix, AZ (US)

( * ) Notice: Subject to any disclaimer, the term of this patent is extended or adjusted under 35 U.S.C. 154(b) by 0 days.

(21) Appl. No.: 18/766,020

(22) Filed: Jul. 8, 2024

(65) Prior Publication Data

US 2024/0399614 A1 Dec. 5, 2024

Related U.S. Application Data

(63) Continuation-in-part of application No. 18/487,531, filed on Oct. 16, 2023, now Pat. No. 12,030,209, (Continued)

(51) Int. Cl.
*B27M 1/08* (2006.01)
*B27M 3/00* (2006.01)
(Continued)

(52) U.S. Cl.
CPC .............. *B27M 1/08* (2013.01); *B27M 3/006* (2013.01); *B27M 3/02* (2013.01); *E04C 3/16* (2013.01)

(58) Field of Classification Search
CPC .... B27M 1/08; B27M 3/0026; B27M 3/0053; B27M 3/006; B27M 3/0086; E04C 3/16; E04C 3/17
See application file for complete search history.

(56) References Cited

U.S. PATENT DOCUMENTS 3,262,723 A 7/1966 Strickler
3,452,502 A 7/1969 Price
(Continued)

OTHER PUBLICATIONS

Screen captures of YouTube Video of EasyFrame Automated Marking Saw (Simpson Strong Tie) posted on Sep. 5, 2023.
(Continued)

*Primary Examiner* — Matthew Katcoff
(74) *Attorney, Agent, or Firm* — Haynes and Boone, LLP

(57) ABSTRACT

Apparatus for forming wooden members used to assemble wooden trusses includes a control computer receiving a batch list identifying each member included in each trusses. A first conveyor transports wooden members from an infeed chute to a finger-jointer joining wooden members end-to-end. A saw cuts the joined wood, and a second conveyor transports cut wooden members past a face printer for printing a component identifier on the face of such member, and past an edge printer for printing identifying assembled truss information upon an edge of selected members. A sensor detecting a member approaching the printers provides a signal to the control computer to synchronize printing by the face printer and to synchronize printing by the edge printer. The face printer and edge printer may be oriented perpendicular to each other. A related method is also disclosed.

4 Claims, 16 Drawing Sheets

Related U.S. Application Data which is a continuation of application No. 18/325,689, filed on May 30, 2023, now Pat. No. 11,787,081.

(51) Int. Cl.
*B27M 3/02* (2006.01)
*E04C 3/16* (2006.01)

(56) References Cited

U.S. PATENT DOCUMENTS

| | | | | |
|---|---|---|---|---|
| 3,692,340 | A | 9/1972 | Roth | |
| 3,702,050 | A | 11/1972 | Price | |
| 3,769,771 | A | 11/1973 | Shannon et al. | |
| 3,813,842 | A | 6/1974 | Troutner | |
| 3,927,705 | A | 12/1975 | Cromeens et al. | |
| 3,942,233 | A | 3/1976 | Cromeens | |
| 4,005,556 | A | 2/1977 | Tuomi | |
| 4,033,391 | A | 7/1977 | Troutner | |
| 4,082,129 | A | 4/1978 | Morelock | |
| 4,095,634 | A | 6/1978 | Berglund et al. | |
| 4,128,119 | A | 12/1978 | Maier | |
| 4,248,280 | A | 2/1981 | Taylor | |
| 4,800,938 | A | 1/1989 | Coombs | |
| 4,938,265 | A | 7/1990 | Mountz | |
| 4,941,521 | A | 7/1990 | Redekop et al. | |
| 5,090,462 | A | 2/1992 | Dimter | |
| 5,440,977 | A | 8/1995 | Poutanen | |
| 5,617,910 | A | 4/1997 | Hill | |
| 5,934,347 | A * | 8/1999 | Phelps | B27M 3/002 144/380 |
| 6,446,412 | B2 | 9/2002 | Mathis | |
| 6,561,239 | B2 | 5/2003 | Englert | |
| 6,701,984 | B2 | 3/2004 | Lamontagne | |
| 7,418,874 | B2 | 9/2008 | Leitinger | |
| 7,971,612 | B2 | 7/2011 | Lapointe | |
| 8,136,804 | B2 | 3/2012 | Leith | |
| 9,573,290 | B2 | 2/2017 | Reis | |
| 9,782,911 | B1 | 10/2017 | Garrett | |
| 9,902,084 | B2 | 2/2018 | Heinz et al. | |
| 10,173,450 | B2 * | 1/2019 | Serrano | B41J 3/407 |
| 10,290,004 | B1 | 5/2019 | Conboy | |
| 10,625,439 | B2 | 4/2020 | Ogden et al. | |
| 11,520,320 | B2 | 12/2022 | Howell et al. | |
| 11,691,310 | B2 * | 7/2023 | Jin | B27B 31/00 83/79 |
| 11,731,307 | B2 * | 8/2023 | Findley | B27B 31/003 144/242.1 |
| 2007/0220825 | A1 * | 9/2007 | Davis | E04C 3/17 52/847 |
| 2022/0119207 | A1 | 4/2022 | Reinbold | |

OTHER PUBLICATIONS

"Horizontal finger jointing lines HS", published on or before May 10, 2011 by Grecon Dimter Holzoptimierung Nord GmbH & Co. KG, downloadable from chrome-extension://efaidnbmnnnibpcajpcglclefindmkaj/https://m.weinig.com/fileadmin/assets/weinig/products/finger-jointing_lines/HS120_HS200/WEINIG_HS_EN.pdf.

"Combiscan Sense Series —Intelligent optimization scanner for all applications", published on or before Mar. 18, 2021 by Weinig Group, downloadable from https://ebooks.weinig.com/view/95970079/.

"Finger jointing lines Turbo-S", published on or before Dec. 31, 2017 by Weinig Grecon GmbH & Co. KG, downloadable from chrome-extension://efaidnbmnnnibpcajpcglclefindmkaj/https://www.weinig.com/fileadmin/assets/weinig/products/finger-jointing_lines/Turbo-S_1000/Turbo-S_engl._2017.pdf.

"Opticut 200 Performance Series", published prior to May 30, 2023 by Weinig Group, and downloadable from https://ebooks.weinig.com/view/96204794/.

"TrueBuild® Batch—Maximizing Your Equipment Investment" by Tracy Roe, published in the Component Manufacturing Advertiser, Green Cove Springs, Florida, in Aug. 2020 #12253 edition, pp. 58-59.

Screen captures from YouTube video captured on Aug. 11, 2023 at https://www.youtube.com/watch?v=CJfOO9PVJJ8 , entitled "Automated and integrated finger jointing line", posted to YouTube by Michael Weinig UK Ltd. on May 12, 2020.

"MiTek Blade II Specification Sheet", published Aug. 1, 2023 by MiTek, Inc. and downloadable from https://www.mitek-us.com/resources/machinery/spec-sheets/.

"MiTek Blade II Printer Options Specification Sheet", published before Jul. 8, 2024, by MiTek, Inc. and downloadable from https://www.mitek-us.com/resources/machinery/spec-sheets/.

Screen capture from YouTube video captured on Aug. 23, 2024 at https://www.youtube.com/watch?v=rljo94xrAiQ, entitled "Blade II—Printer Maintenance Overview", posted to YouTube by MiTek, Inc. on Apr. 17, 2024.

* cited by examiner

WOODEN TRUSS MANUFACTURING SYSTEM INCLUDING MULTIPLE PRINTERS AND METHOD

CROSS-REFERENCE TO RELATED PATENT APPLICATION

This non-provisional patent application is a continuation-in-part of, and claims the benefit of the earlier filing date of prior-filed U.S. non-provisional patent application Ser. No. 18/487,531, filed Oct. 16, 2023, entitled "Wooden Truss Manufacturing System And Method", which was in turn a continuation of, and claims the benefit of the earlier filing date of, prior-filed U.S. non-provisional patent application Ser. No. 18/325,689, filed on May 30, 2023, entitled "Wooden Truss Manufacturing System And Method", under 35 U.S.C. 120.

BACKGROUND OF THE INVENTION

Technical Field

The present application generally relates to systems and methods for manufacturing wooden components used to construct wooden roof trusses, wooden floor trusses and wooden wall panels, and more particularly, to a system and method for automatically producing and labelling such wooden components and assembled trusses in an efficient, reliable and economical manner.

State of the Art

Construction of wooden homes and buildings often requires a series of wooden roof trusses for supporting the roof of the home or building. Often, such roof trusses are constructed at a centralized manufacturing site and then transported to the work site where the home or building is being erected. For a typical sloped roof, each roof truss typically includes a bottom chord that extends horizontally along with a pair of opposing top chords that extend upwardly from the ends of the bottom chord toward an upper ridge or peak. A series of diagonal webs and/or vertical posts, extend between the bottom chord and the upper chords to reinforce the truss structure. A single home or building may require ten, twenty, or more different types of roof truss members, each with its own combination of bottom chords, upper chords and webs/posts. It is not unusual for a particular building to require, for example, over 600 components (bottom chords, upper chords, webs/posts) to form the various roof trusses required to construct the roof of such building.

Apart from roof trusses, building construction often makes use of wooden wall panels and wooden floor trusses, which may also include wooden chords interconnected by webs and/or posts.

In order to properly bear the loads specified for each such roof truss, each bottom chord, upper chord and web/post of a given truss must be made from wood boards of a particular grade and particular cross-sectional dimensions. In designing wooden roof trusses, it is common to form the various components of each wooden truss from one of five different starting materials, namely, a) 2 inch×6 inch SPF2100 wood boards; b) 2 inch×6 inch SPF1650 wood boards; c) 2 inch×4 inch SPF2100 wood boards; d) 2 inch×4 inch SPF1650 wood boards; and 2 inch×4 inch SPF #2 wood boards. A given truss may be formed of several components, each of which is formed from a different grade, and different cross-sectional dimensions, than other component parts within the same truss. Each such component must have a specified length. Further, the ends of such components often require angled cuts for allowing the components to be joined together at their ends when assembling the truss.

Efforts have been made in the past to mass-produce wooden roof truss components. For example, U.S. Pat. No. 5,934,347 to Phelps, discloses a system and method for precutting lumber used for building trusses and frames. While the system disclosed in U.S. Pat. No. 5,934,347 provided several improvements over prior production systems, the system described in U.S. Pat. No. 5,934,347 still required at least one operator to manually control the process of infeeding boards of the various grades and dimensions into the system. As set forth in the '347 patent specification, an operator stands at the chute area and feeds the needed grade of lumber onto a conveyor belt one board at a time. The operator at the infeed chute visually checks the quality of each board and feeds it onto a continuous conveyor line, one board at a time in linear relationship to one another. If the operator identifies a board as being visually defective, the operator rejects the board and does not feed it onto the continuous conveyor line. If the board is not defective but needs trimming to eliminate a bad spot on the end of the board, the operator marks the board as one needing trimming. In addition, in the system described in the '347 patent, the infeed operator "crowns" all of the boards in the same direction, i.e., the operator visually inspects each board to see if the board is bowing upwardly or downwardly, and manually flips selected boards to ensure that all boards "crown" in the same direction, e.g., that all boards bow upwardly. The need for an operator to visually inspect each board, to mark defective boards, and to manually feed each board onto the conveyor, and to selectively flip boards to ensure that they all crown in the same direction, increases labor costs and slows down the system.

In addition, the system of the '347 patent requires an actual manual operator to detect defects at an end of a wooden board. Such defects are either detected and marked by the operator manning the infeed chutes, or by a second operator viewing the boards as they travel along the linear conveyor belt. In either case, the defective board must be side ejected to a trim area for removal of the defect by the second operator, after which the board is returned to the continuous conveyor line in linear arrangement with the other boards. The need for the first and second operators to visually detect such defects, the need to eject such boards to a separate trim area for cutting out the defects, and the need to return the trimmed boards back to the conveyor line, necessarily slows down the through-put of the system and places greater burdens upon the operators. A further disadvantage of the system of the '347 patent is the need for an RF tunnel to dry and set the glue used to join together the ends of the boards grooved by the finger-jointer line. Due to the use of an RF tunnel, incoming wooden boards need to be scanned for the presence of metal (from metal staples, nails, etc.), since metal components will disrupt the radio wave energy broadcast in the RF tunnel. The '347 patent also describes situations wherein the rejection of a board downstream from the infeed chutes results in the need for a warning to be sent to the manual infeed operator that an additional board must be fed-in to make up for the board being rejected downline; this places additional demands on the manual infeed operator, and further slows the throughput of the system.

Roof trusses, floor trusses and wall panels that are manufactured remote from the site at which a building is to be constructed must be transported to the building site. The most common method of transporting such assemblies is by truck. In order to minimize transportation costs, such elements are typically stacked on each other to form more compact bundles. Once a truck arrives at the construction site, a crane may be used to unload truss assemblies and wall panels from the truck. However, it can be difficult identify and distinguish one roof truss from another, one wall panel from another, or one floor truss from another, particularly when they have been stacked together. The ability to identify and distinguish one type of assembled truss or panel from another can make the loading process run more efficiently by allowing a responsible party to more easily confirm that the correct type and quantity of assembled trusses and panels have been loaded onto the truck. Likewise, the ability to identify and distinguish one type of assembled truss or panel from another can make the loading process run more efficiently by allowing workers at the construction site to quickly confirm that the correct type and quantity of assembled trusses and panels have been delivered to the site, and to select a desired truss or panel for removal by the crane operator and for positioning such desired truss or panel at the proper location within the building. Unfortunately, any identifying information printed or labeled on the broader faces of the wooden members that make up a truss or panel are often hidden from view once such trusses or panels are stacked together.

In addition, it can be advantageous to be able to identify installed wooden truss assemblies after they have been installed in a building project, for example, by an observer located on the ground looking up at an installed roof truss, or by an observer positioned atop the roofing framework during installation of the roof. However, it can be difficult to identify a particular wooden truss type when viewing such wooden truss from below or from above.

SUMMARY OF THE INVENTION

It is therefore an object of the present invention to provide an apparatus and method for manufacturing wooden components used to construct wooden roof trusses, wooden floor trusses or wooden wall panels in an automatic, efficient, reliable, and economical manner.

Another object of the present invention is to provide such an apparatus and method which minimizes the need for manual labor.

Still another object of the present invention is to provide such an apparatus and method which avoids the need for visual inspection and/or manual marking of wooden boards by a human operator.

Yet another object of the present invention is to provide such an apparatus and method which eliminates the need for a human operator to manually feed, and/or manually flip, wooden boards placed on a conveyor for further processing.

A further object of the present invention is to avoid the need for a human operator to detect defects at the ends of wooden boards.

A still further object of the present invention is to eliminate the need to eject defective boards to the side for off-line trimming by a human operator to remove the defect, as well as the need to return the trimmed boards back to the conveyor line.

Still another object of the present invention is to provide such an apparatus and method wherein removal of a board due to a defect automatically increments the number of raw boards being fed in by the selected infeed chute.

Another object of the present invention is to provide an apparatus and method for manufacturing wooden components used to construct wooden roof trusses, wooden floor trusses and/or wooden wall panels in a manner which allows assembled trusses and/or panels to be easily identified after such trusses and/or panels have been assembled, even when such trusses and/or panels have been stacked together.

These and other objects of the present invention will become more apparent to those skilled in the art as the description of the present invention proceeds.

Briefly described, and in accordance with various embodiments thereof, the present invention relates to a method of cutting wooden members used to assemble a plurality of wooden trusses or frames. Each such truss generally includes at least first and second chords and a plurality of web members, or posts, for extending between the first and second chords, wherein at least one web member is formed from wood of a first type and at least another web member is formed from wood of a second type. In practicing such method, a control computer is provided, including a processor and a memory for storing a control program. The control computer includes an input interface for receiving a batch list selected by an operator. This batch list identifies each of the chords and web members that are included in each of the wooden trusses required for a particular building. The operator inputs the batch list to the control computer, and the control computer generates control signals for controlling other components of the system.

A first conveyor is provided for transporting wooden members therealong. A first infeed chute is provided in which wooden members of the first type are stored. The first infeed chute receives control signals from the control computer to automatically transfer wooden members of the first type to the first conveyor. At least a second infeed chute is also provided in which wooden members of the second type are stored. The second infeed chute also receives control signals from the control computer to automatically transfer wooden members of the second type to the first conveyor.

As wooden members are conveyed by the first conveyor, they are scanned by a scanner to detect defects located adjacent an end of each such wooden member. Any such detected defects are then trimmed by an inline defect saw without requiring ejection of such wooden members to a separate defect trim area.

The wooden members are then advanced to a finger-jointer which serves to join wooden members received thereby end-to-end by grooving and gluing the ends of the wooden members and crowding them together to discharge a continuous length of joined wood. The continuous length of joined wood discharged from the finger-jointer is conveyed to a first flying saw for cutting the continuous length of joined wood into predetermined lengths. The flying saw receives control signals from the control computer for determining the lengths of wooden members to be cut from the continuous length of joined wood discharged from the finger-jointer.

The wooden members cut by the first flying saw are then conveyed to a cutting saw for selectively cutting the received wooden members into two or more web member blanks in response to control signals received from the control computer. Each such web member blank has ends generally perpendicular to the length of such web member blank. In at least one embodiment, this cutting saw is a second flying saw.

The web member blanks are then conveyed to a component saw for cutting angles on the ends of the web member blanks in response to control signals received from the control computer. The web members produced by the component saw are finished web members which may be used to assemble the various of wooden trusses specified in the batch list.

In practicing the above-summarized method, the control computer executes the control program to analyze the batch list selected by the operator and causes the first infeed chute to automatically transfer wooden members of the first type to the first conveyor in an amount sufficient to produce all web members formed from wood of the first type required by the batch list, and then causes the second infeed chute to automatically transfer wooden members of the second type to the first conveyor in an amount sufficient to produce all web members formed from wood of the second type required by the batch list. In one embodiment, wood of the first type stored at the first infeed chute has a first grade rating, and wood of the second type stored at the second infeed chute has a second grade rating that is lower than the first grade rating. The control computer causes the first infeed chute to automatically transfer wooden members of the first type having the first grade rating to the first conveyor in an amount sufficient to produce all web members formed from wood of the first type required by the batch list, and then causes the second infeed chute to automatically transfer wooden members of the second type having the second grade rating to the first conveyor in an amount sufficient to produce all web members formed from wood of the second type required by the batch list.

In one embodiment of the foregoing method, the step of scanning the wooden members includes scanning wooden members being conveyed by the first conveyor to detect wooden members having excessive moisture content. In at least one embodiment, the foregoing method further includes the step of removing wooden members having excessive moisture content from the first conveyor before they are transported to the finger jointer.

In one embodiment of the foregoing method, the step of scanning the wooden members includes scanning conveyed wooden members to detect a degree of crowning of each such wooden member. In at least one embodiment, the foregoing method includes the further step of selectively cutting conveyed wooden members into shorter lengths to reduce the degree of crowning present in the shorter length wooden members.

In one embodiment of the foregoing method, each finished web member produced by the component saw is conveyed past an ink jet printer for printing a label on each finished web member identifying a particular type of web member identified in the batch list.

In at least one embodiment of the foregoing method, the finished web members are conveyed to an automatic stacker for stacking the finished web members into separate stacked piles corresponding to the particular type of web member so produced.

In at least one embodiment of the foregoing method, the length of each wooden member being transferred by the first infeed chute to the first conveyor is scanned during transfer to the first conveyor, and the scanned length is transmitted to the control computer, whereby the control computer may track the total lineal length of wooden boards loaded from the first infeed chute onto the first conveyor. Similarly, the length of each wooden member being transferred by the second infeed chute to the first conveyor is scanned during transfer to the first conveyor, and the scanned length is transmitted to the control computer, whereby the control computer may track the total lineal length of wooden boards loaded from the second infeed chute onto the first conveyor.

In at least one embodiment, each of the first and second infeed chutes includes a crowning sensor for sensing the crowning direction for each wooden member being transported onto the first conveyor, as well as a flipper for rotating wooden members about their longitudinal axes by 180 degrees. If the sensed crowning direction for a particular wooden member differs from a desired crowning direction, the method includes the step of flipping such wooden member by 180 degrees before they are deposited onto the first conveyor, whereby all wooden members deposited onto the first conveyor crown in the same direction.

Another aspect of the present invention is an apparatus, or system, for cutting wooden members used to assemble wooden trusses or frames. Each such truss generally includes at least first and second chords and a plurality of web members, or posts, for extending between the first and second chords, wherein at least one web member is formed from wood of a first type and at least another web member is formed from wood of a second type.

In one embodiment, the aforementioned apparatus or system includes a control computer having a processor and a memory for storing a control program. The control computer includes an input interface for receiving a batch list selected by an operator, wherein the batch list identifies each web member included in each of the series of wooden trusses. The control computer generates control signals distributed to the other components of the system to coordinate the production of the various web members.

The foregoing apparatus includes a first conveyor for transporting wooden members therealong. A first infeed chute includes stored wooden members of the first type. In response to control signals received from the control computer, the first infeed chute automatically transfers wooden members of the first type to the first conveyor. Similarly, a second infeed chute includes stored wooden members of the second type. In response to control signals received from the control computer, the second infeed chute automatically transfers wooden members of the second type to the first conveyor.

In one embodiment, the aforementioned apparatus includes a scanner associated with the first conveyor for scanning wooden members being conveyed thereby to detect defects located adjacent an end of each wooden member. An inline defect saw is associated with the first conveyor for trimming defects detected by the scanner from the ends of wooden members passing thereby.

A finger-jointer has an inlet for receiving wooden members transported by the first conveyor. The finger-jointer serves to join the wooden members received thereby end-to-end by grooving the ends of each wooden member, applying glue to the grooved ends, and crowding together the ends of adjacent wooden boards to discharge a continuous length of joined wood at its outlet.

A first flying saw receives the continuous length of joined wood discharged from the outlet of the finger-jointer, and cuts it into predetermined lengths of wooden members. The first flying saw receives control signals from the control computer for determining the lengths of wooden members cut from the continuous length of joined wood discharged from the finger-jointer. The cut wooden members leaving the first flying saw are received by a cutting saw for selectively cutting the received wooden members into two or more web member blanks in response to control signals received from the control computer. Each such web member blank has ends generally perpendicular to the length of each web member blank. In at least some embodiments, the cutting saw is a second flying saw.

A component saw receives the web member blanks cut by the cutting saw. In response to control signals received from the control computer, the component saw cuts angles on the ends of the web member blanks to produce finished web members used to assemble the plurality of wooden trusses specified in the selected batch list.

The control computer included in the apparatus summarized above executes the control program to analyze the batch list selected by the operator and causes the first infeed chute to automatically transfer wooden members of the first type to the first conveyor in an amount sufficient to produce all required web members that are formed from wood of the first type, and then causes the second infeed chute to automatically transfer wooden members of the second type to the first conveyor in an amount sufficient to produce all required web members that are formed from wood of the second type.

In one embodiment of the foregoing apparatus, wood of the first type has a first grade rating; wood of the second type has a second grade rating that is lower than the first grade rating; and the control computer causes the first infeed chute to automatically transfer wooden members of the first type (having the first grade rating) to the first conveyor in an amount sufficient to produce all required web members formed from wood of the first type. The control computer then causes the second infeed chute to automatically transfer wooden members of the second type (having the second grade rating) to the first conveyor in an amount sufficient to produce all required web members that are formed from wood of the second type.

In at least one embodiment of the foregoing apparatus, the scanner scans wooden members being conveyed by the first conveyor to detect wooden members having excessive moisture content. In at least some such embodiments, the apparatus also includes an extractor for removing wooden members having excessive moisture content from the first conveyor before they are transported to the inlet of the finger jointer.

In at least one embodiment of the foregoing apparatus, the scanner scans wooden members being conveyed by the first conveyor to detect a degree of crowning for each such wooden member. In at least some such embodiments, the defect saw selectively cuts wooden members being conveyed by the first conveyor to reduce the degree of crowning in the cut wooden members.

In one embodiment of the foregoing apparatus, an ink jet printer is provided for receiving finished web members produced by the component saw, and for printing a label on each finished web member identifying a particular type of web member identified in the batch list.

In at least some embodiments of the foregoing apparatus, an automatic stacker receives the finished web members produced by the component saw for stacking the finished web members into separate stacked piles corresponding to the particular type of web member so produced.

In at least one embodiment of the foregoing apparatus, the first infeed chute includes a first lineal scanner for detecting the length of each wooden member transferred by the first infeed chute to the first conveyor, and for transmitting such scanned length to the control computer, whereby the control computer may track the total lineal length of wooden boards loaded from the first infeed chute onto the first conveyor. Similarly, the second infeed chute includes a second lineal scanner for detecting the length of each wooden member transferred by the second infeed chute to the first conveyor, and for transmitting such scanned length to the control computer, whereby the control computer may track the total lineal length of wooden boards loaded from the second infeed chute onto the first conveyor.

In some embodiments of the foregoing apparatus, each of the first and second infeed chutes includes a crowning sensor for sensing the crowning direction for each wooden member being transported onto the first conveyor, as well as a flipper for rotating wooden members about their longitudinal axes by 180 degrees. If the sensed crowning direction for a particular wooden member differs from a desired crowning direction, the flipper is actuated to rotate such wooden member by 180 degrees before it is deposited onto the first conveyor, whereby all wooden members deposited onto the first conveyor crown in the same direction.

In a further aspect, an apparatus for forming wooden members used to assemble wooden trusses, each truss including chords and web members for extending between the chords, includes a control computer having a processor and a memory for storing a control program. The control computer includes an input interface for receiving a batch list selected by an operator to identify chords and web members included in each truss. An infeed chute receives control signals from the control computer to automatically transfer stored wooden members to a first conveyor that transports wooden members therealong. A finger-jointer receives wooden members transported by the first conveyor joins them together end-to-end, and discharges a continuous length of joined wood at its outlet. At least one saw cuts the continuous length of joined wood discharged by the finger-jointer into lengths of cut wooden members in response to control signals received from the control computer, each cut wooden member having a pair of opposing faces and a pair of opposing edges. A second conveyor transports the cut wooden members. A face printer is disposed along the second conveyor and coupled to the control computer for printing identifying component information upon one of the faces of each cut wooden member; the identifying component information indicates a particular component within a wooden truss structure. An edge printer is also disposed along the second conveyor and is coupled to the control computer for printing identifying assembled truss information upon one of the edges of selected cut wooden members; the identifying assembled truss information indicating a particular assembled wooden truss. In at least one embodiment, the face printer and edge printer are oriented perpendicular to each other.

In at least one embodiment, a sensor is disposed along the second conveyor upstream from the face printer and edge printer and is coupled to the control computer for detecting a forwardmost end of a cut wooden member. The sensor provides a detection signal to the control computer to synchronize printing by the face printer and to synchronize printing by the edge printer.

Another aspect relates to a method of printing identifying information on components of wooden trusses and printing identifying information on assembled wooden trusses. Each wooden truss includes chords and web members for extending between such chords. The method includes providing a control computer having an input interface for receiving a batch list selected by an operator to identify the chords and web members included in each wooden truss. The method includes providing at least one infeed chute in which wooden members are stored; providing a first conveyor for transporting wooden members therealong; and transferring wooden members from the infeed chute to the first conveyor in response to control signals received from the control computer. The method further includes providing a finger-jointer receiving wooden members transported by the first conveyor, joining wooden members received thereby end-to-end, and discharging a continuous length of joined wood. The continuous length of joined wood discharged by the finger-jointer is conveyed to at least one saw that cuts the continuous length of joined wood into lengths of cut wooden members in response to control signals received from the control computer. The cut wooden members are transported along a second conveyor. A face printer is disposed along the second conveyor for printing identifying component information upon one of the faces of each cut wooden member in response to control signals received from the control computer, the identifying component information indicating a particular component within a wooden truss structure. An edge printer is disposed along the second conveyor for printing identifying assembled truss information upon one of the edges of selected cut wooden members in response to control signals received from the control computer to indicate a particular assembled wooden truss. In at least one embodiment, the method includes orienting the face printer and the edge printer perpendicular to each other.

In at least one embodiment of the foregoing method, the method includes detecting that the forwardmost end of a cut wooden member conveyed by the second conveyor is approaching the face printer and the edge printer, and providing a detection signal to the control computer signaling that the forwardmost end of a cut wooden member conveyed by the second conveyor is approaching the face printer and the edge printer. The method may include using the control computer to synchronize printing by the face printer and to synchronize printing by the edge printer. In at least some embodiments, the identifying assembled truss information is printed upon an edge of each selected cut wooden member at approximately the same distance from the forwardmost end of each selected cut wooden member whereby, when a plurality of assembled wooden trusses are stacked together, the identifying assembled truss information printed on such plurality of assembled wooden trusses lies substantially along a common row.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

Figure 1:
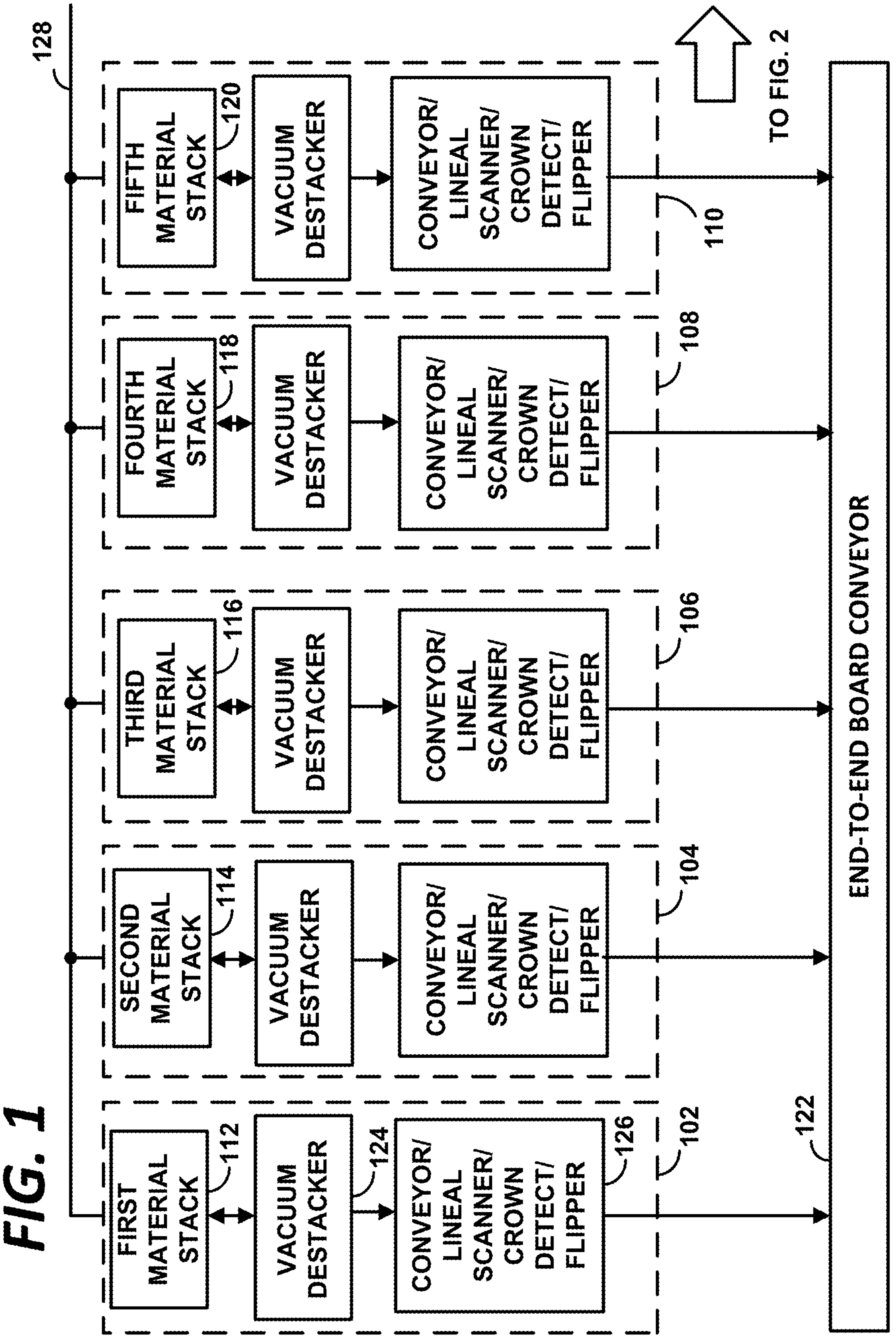
FIG. 1 is a block diagram showing five infeed chutes each transporting wooden boards of a particular grade and cross-section dimension to an end-to-end board conveyor in accordance with an embodiment of the present invention.

Referring to FIG. 1 of the drawings, an apparatus for cutting wooden members used to assemble wooden trusses and/or wooden frames includes a series of five infeed chute areas designated 102, 104, 106, 108 and 110, respectively. Within infeed chute 102, a first material stack 112 of wooden members is stored; for example, these wooden members might be of the type rated as SPF2100 and having cross-sectional dimensions measuring approximately 2 inches by 6 inches. Material stack 112 might be initially deposited in infeed chute 112 by a forklift operator as a bundled stack of lumber received from a lumber mill, after which the forklift operator cuts and removes any bands or straps that were used to secure the lumber bundle.

The SPF designation is an acronym for "Spruce-Pine-Fir", and the number following the "SPF" designation relates to the bending force which such wooden member can safely bear. Thus, a two inch by six inch wood board rated SPF2100 can bear a greater load than a two inch by six inch wood board rated at SPF1650. Designers of wooden trusses and frames often use computer programs to calculate the grade and cross-sectional dimensions of each member in a given truss or frame in order to safely bear specified loads.

As in the case of infeed chute 102, infeed chutes 104, 106, 108 and 110 also include material stacks 114, 116, 118, and 120, respectively, each having wooden members of a different grade and/or cross-sectional dimension. For example, material stack 114 might contain wooden members of the type rated as SPF1650 and having cross-sectional dimensions measuring approximately 2 inches by 6 inches. Material stack 116 might contain wooden members of the type rated as SPF2100 and having cross-sectional dimensions measuring approximately 2 inches by 4 inches. Material stack 118 might contain wooden members of the type rated as SPF1650 and having cross-sectional dimensions measuring approximately 2 inches by 4 inches. Finally, material stack 120 might contain wooden members rated as SPF #2 and having cross-sectional dimensions measuring approximately 2 inches by 4 inches; SPF #2 lumber is lower cost and more economical than the other grades mentioned. All of the wooden boards stored in material stacks 112-120 may vary in length, but are often provided in approximately 14-foot lengths.

Still referring to FIG. 1, infeed chute 102 includes machinery for removing wooden boards from the top layer of material stack 112 for transport toward, and deposit upon, end-to-end board conveyor 122. Within FIG. 1, board conveyor 122 moves wooden boards deposited thereon from left to right. Infeed chute 102 includes a vacuum destacker 124 which is automatically triggered by a control computer (to be described in greater detail below) to move over material stack 112, lower itself onto the upper layer of wooden members in material stack 112, temporarily grab (by vacuum force) the wooden members on the upper layer of material stack 112, raise upwardly, and then transport such wooden members onto a chain roller conveyor 126 for transport onto end-to-end board conveyor 122. This sequence is repeated under the control of the control computer until infeed chute 102 has deposited a sufficient number of SPF2100 boards onto conveyor 122 such that the total lineal footage of such boards will be sufficient to form all of the 2×6 SPF2100 wooden members required by a particular truss batch list selected by the operator of the control computer. As in the case of infeed chute 102, the other infeed chutes include a similar vacuum destacker, and a similar chain roller conveyor, which function in a similar manner. In FIG. 1, network cable 128 represents an electrical connection between each of infeed chutes 102-110 and the control computer over which control signals may be sent from the control computer to each infeed chute, and over which each of the infeed chutes may send data (such as lineal footage readings) back to the control computer.

Since the control computer needs to monitor the total lineal footage of boards deposited onto conveyor 122 by infeed chute 102, chain roller conveyor 126 preferably includes a lineal scanner which scans the length of each wood board being conveyed thereby, and the results of such reading are provided to the control computer. Likewise, each of the chain roller conveyors provided in infeed chutes 104-110 also includes its own lineal scanner for sending the same information to the control computer.

It is also desired that each wooden board deposited onto conveyor 122 by each of infeed chutes 102-110 has its "crown" directed in the same direction. Often, wood boards sourced by a lumber mill are not perfectly flat or planar. Rather, if the board were to be laid on a flat concrete floor, a curvature or bowing would be observed. If the ends of the board contact the concrete floor, but the central portion of the board is raised above the floor, then the board is said to be "crowning upwardly". In contrast, if the ends of the board are raised above the floor, and the central portion of the board is in contact with the floor, then the board is said to be "crowning downwardly". It is desired that all wooden boards deposited upon conveyor 122 be "crowning" in the same direction as each other. To achieve this result, a crowning scanner, which employs a laser beam, is included adjacent chain roller conveyor 126 in infeed chute 102 for detecting the crowning direction of each wooden board transported thereby; a board flipper is also included in chain roller conveyor 126 which selectively rotates a wooden board about its longitudinal axis by 180 degrees in response to the crowning scanner. In this manner, each board that is deposited onto conveyor 122 by chain roller conveyor 126 crowns in the same direction as every other wooden member deposited onto conveyor 122. Likewise, each of the chain roller conveyors provided in infeed chutes 104-110 also includes its own crowning scanner and board flipper for ensuring that all boards crown in the same direction. It will be noted that the crowning scanners incorporated within the infeed chutes do not measure the degree of crowning, but only the direction of crowning.

In carrying out the production of truss components using the apparatus described herein, it is preferred that, for boards of a given cross-sectional dimension (i.e., 2 inch by six inch, or 2 inch by four inch), infeeding begins with boards of the highest grade. In other words, if a given truss batch list includes some members formed from 2 inch by six inch SPF2100 boards and other members formed from 2 inch by six inch SPF1650 boards, then it is preferred to begin with the infeeding of the 2 inch by six inch SPF2100 boards until all truss components requiring 2 inch by six inch SPF2100 wood have been produced. At that point, infeed chute 102 can be de-activated by the control computer in favor of infeed chute 104. Even if, at that point, there are still SPF2100 boards being conveyed toward the finger jointer (to be described in greater detail below), or even if SPF2100 continuous jointed lumber is still emerging from the finger jointer, such excess material may be safely used to form the first several truss components which are specified to use SPF1650 material. Likewise, when the system is done producing components requiring SPF2100 2 inch by 4 inch material supplied by infeed chute 106, any boards still in process can safely be incorporated into truss components that merely require SPF1650 2 inch by 4 inch material supplied by infeed chute 108. Similarly, when the system is done producing components requiring SPF1650 2 inch by 4 inch material supplied by infeed chute 108, any boards still in process can safely be incorporated into truss components that merely require SPF #2 2 inch by 4 inch material supplied by infeed chute 110.

Figure 2:
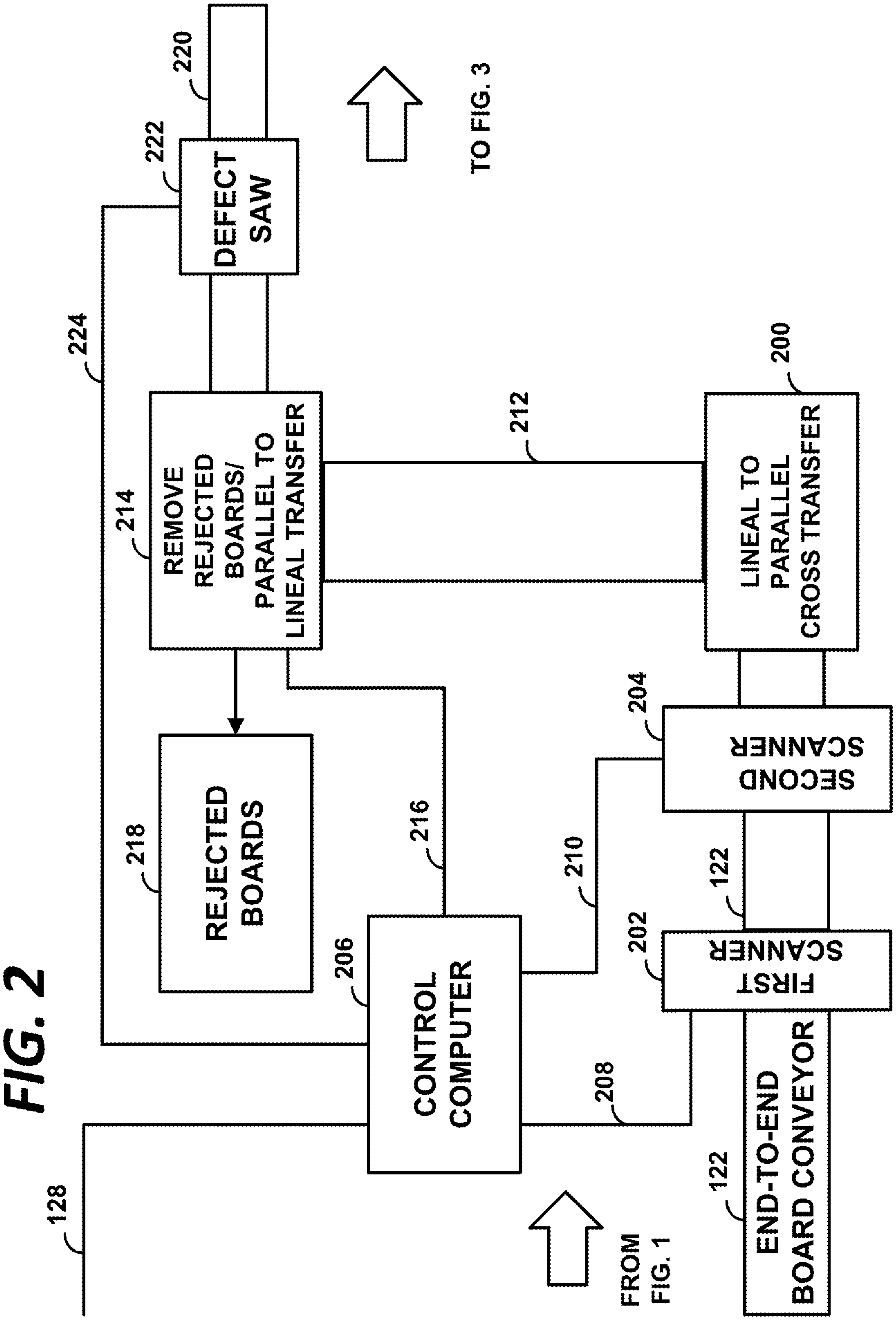
FIG. 2 is a block diagram continued from FIG. 1 showing a pair of board scanners, components for removing rejected boards, and an inline defect saw.

Turning now to FIG. 2, end-to-end board conveyor 122 continues conveying wooden boards to the right until reaching lineal to parallel cross-transfer chain rollers 200. In transit, each wooden member transported on end-to-end board conveyor 122 passes through a first scanner 202 and a second scanner 204. First scanner 202 scans each board to determine its moisture content and to determine the degree of curvature (i.e., the degree of crowning) for each board. Boards that have excessive moisture content cannot be relied upon to achieve the structural integrity of a truss or frame and must be rejected. Alternatively, boards that have excessive curvature, or crowning, need to be cut into two, or even three, shorter lengths to eliminate such excessive curvature. After leaving scanner 202, the boards pass through scanner 204 which detects knots or other defects that are present at one or both ends of each board. The presence of a knot or similar defect at the end of the board will compromise the strength of a joint formed between such end and the end of an adjacent board in the finger-jointing line to be described in greater detail below. Both scanners 202 and 204 are coupled with control computer 206 by network cables 208 and 210 for providing scanned information to control computer 206. It should be noted that neither scanner 202 nor scanner 204 detects the presence of metal (e.g., metal staples); since the gluing operation in the finger-joint line (to be described below) does not rely upon the use of an RF tunnel, there is no concern for the presence of metal in such wooden boards.

After scanning by scanners 202 and 204, the wooden boards on conveyor 122 are transferred to lineal to parallel cross transfer 200 and transported by conveyor 212 in parallel orientation to machinery designated 214. Machinery 214 is coupled to control computer 206 by network cable 216, and when signaled to do so, machinery 214 removes defective boards that have excessive moisture content, and transfers them to rejected boards area. While not common, machinery 214 can also transfer a board to the rejected boards area if its degree of curvature is so great that even cutting the board into two or three shorter lengths will not adequately address the issue of excessive curvature.

Those boards which are not rejected by machinery 214 are passed end-to-end, in lineal orientation, on conveyor 220, passing through defect saw station 222. Defect saw 222 is coupled by network cable 224 to control computer 206, and based upon control signals provided by control computer 206, defect saw either allows each board to pass therethrough without interference, or cuts one or both ends of such board, depending upon whether scanner 204 detected a defect at one or both ends of such board. In addition, defect saw may also be signaled by control computer 206 to cut a board in two equal shorter sections, or alternatively, in three equal shorter sections. The amount of "crown" for a given board should not be more than 3/16 inch. By cutting longer boards having excessive crown into two or three shorter sections, it is often possible to reduce the amount of crown in the shorter, cut sections below 3/16 inch.

Figure 3:
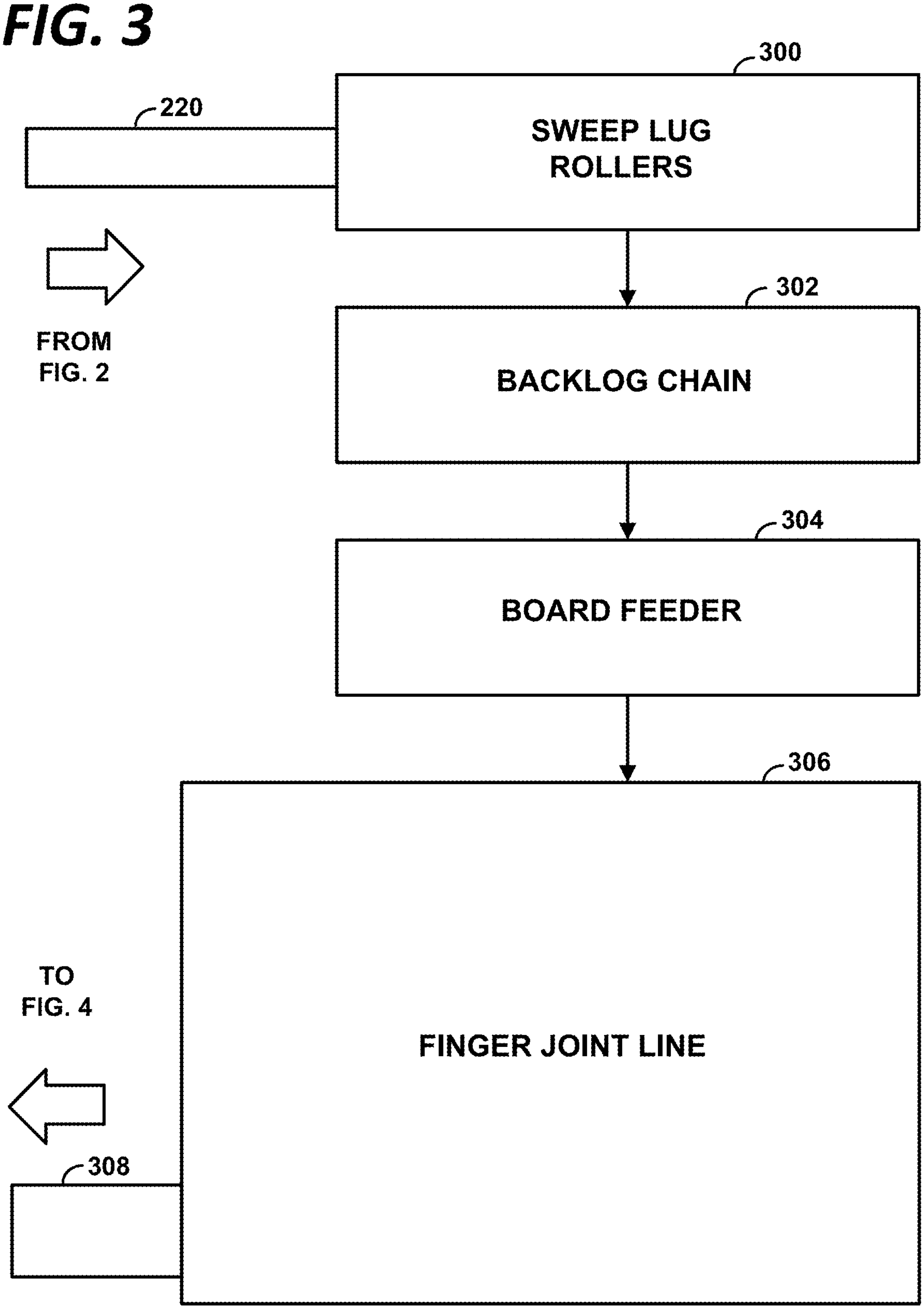
FIG. 3 is a block diagram continued from FIG. 2 and showing transfer of wooden boards to a finger-jointing line for indexing and grooving the ends of wooden boards for forming finger joints between the ends of such boards.

With reference to FIG. 3, wooden boards conveyed by conveyor 220 are transported to sweep lug rollers which receive the wooden boards and re-orient the boards into parallel configuration. The boards are then passed to backlog chain area wherein all of the parallel boards are urged to the right, so that their rightmost ends align with each other. It should be kept in mind that the boards reaching this point may be of widely differing lengths.

The aligned boards are then passed to board feeder 304 in which they are aligned and indexed so that they all lie perfectly parallel to each other, perpendicular to the direction of travel, and are then fed to finger joint line area 306. Such finger joint lines are commercially available from Michael Weinig Inc. of Mooresville, North Carolina. Such finger joint lines are designed to cut interlocking grooves in the rightmost ends of wooden boards, and then realign the boards to align along their leftmost ends by rolling the boards to the opposite side. Once the left edges of the boards are aligned with each other, complementary interlocking grooves are cut in the leftmost ends of such boards. After the interlocking grooves are cut, glue is applied to the grooved ends. The ends of adjacent boards are then interlocked and compressed together, or "crowded", under pressure to form a secure joint between the ends of adjacent boards. The result is a continuous output of finger-jointed material which can later be cut to desired lengths.

Figure 4:
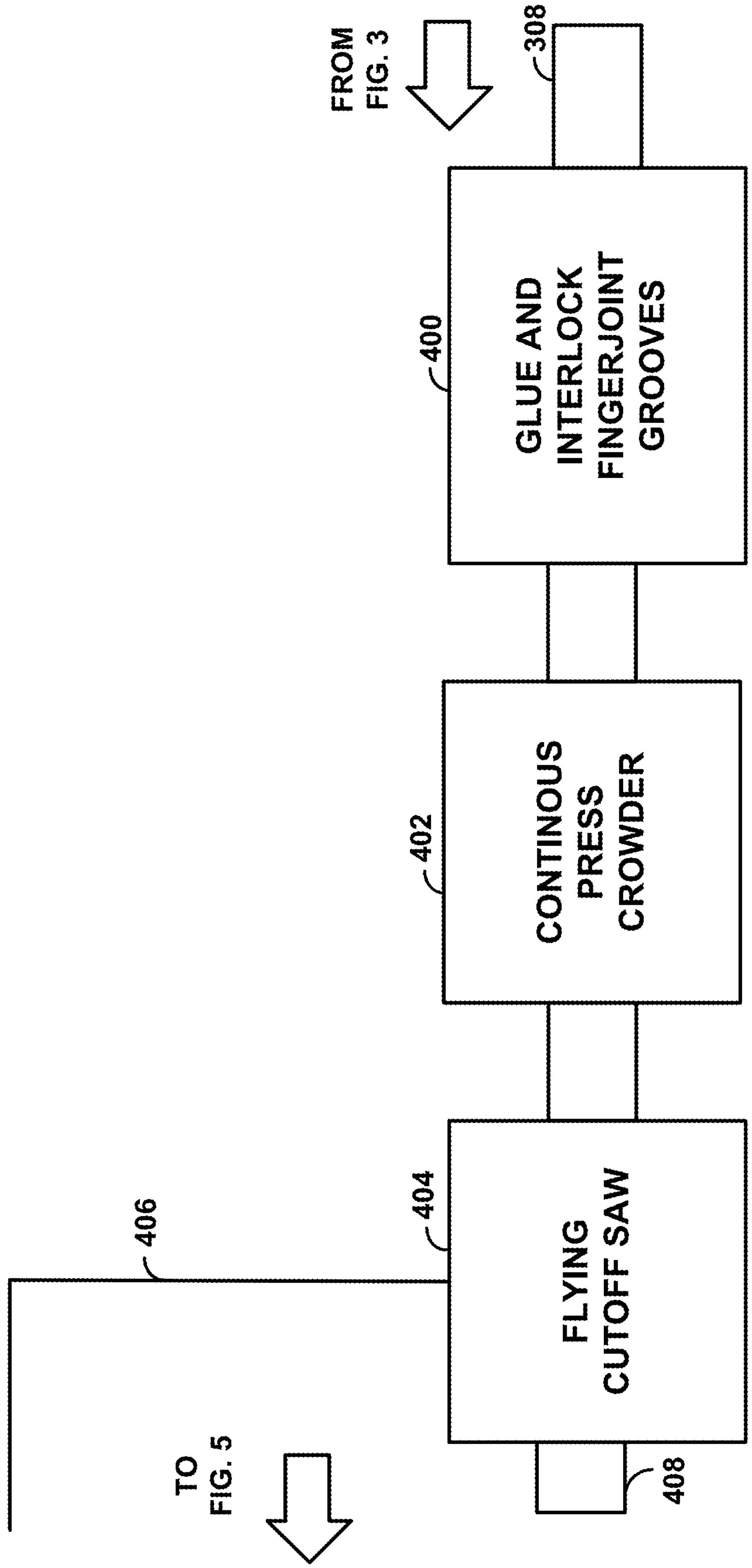
FIG. 4 is a block diagram continued from FIG. 3 showing stages for applying glue to the grooved ends of the wooden boards, crowding the glued ends together, and a flying cutoff saw for cutting a continuous stream of finger-jointed wood into predetermined lengths.

Referring now to FIGS. 3 and 4, the grooved boards leave finger joint line 306 on conveyor 308 in lineal end-to-end orientation and pass through glue/interlock station 400 where glue is applied to the grooved ends, and the ends of adjacent boards are interlocked with each other. The interlocked stream of boards then passes to continuous press crowder 402 in which the interlocked joints are compressed together under pressure to form a sturdy joint.

Still referring to FIG. 4, the continuous stream of jointed lumber is then passed to a first flying cutoff saw 404. A "flying" saw is so-called because it is designed to move in synchronization with a material conveyor for cutting the material without the need to stop the transport of such material. Such a flying saw is able to cut precise lengths of material from the continuous stream of finger jointed wood without stopping the incoming stream. As shown in FIG. 4, flying cutoff saw 404 is coupled to control computer 206 by network cable 406 and is responsive to control signals received from control computer 206. It will be noted that, in some cases, flying cutoff saw 404 will allow a rather large length of finger-jointed material to pass thereby before making a cut; this is particularly true when such length will be used to form, for example, a bottom chord of a roof truss, or one of the upper chords of a roof truss. However, in many cases, particularly when material is needed to form web or post components of a truss, flying cutoff saw 404 will cut predetermined lengths (e.g., ten foot sections, or twelve foot sections) of finger-jointed material that will be further processed as described below. Cut members passing through flying cutoff saw 404 are conveyed in lineal end-to-end fashion by conveyor 408.

Figure 5:
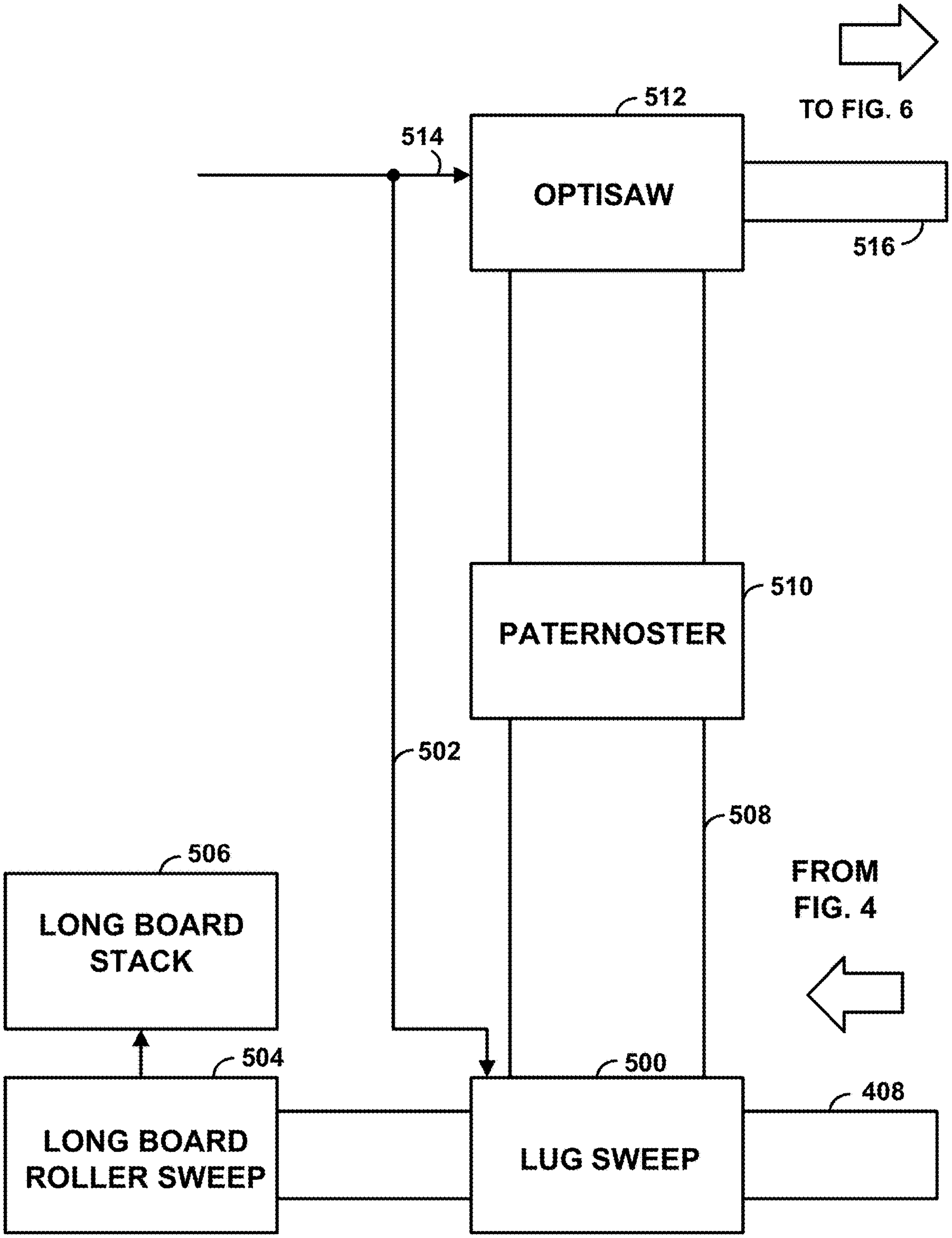
FIG. 5 is a block diagram continued from FIG. 4 and showing a lug sweep for selectively allowing longer members to bypass further cutting operations, a paternoster, and an optisaw for further cutting finger-jointed wood into smaller lengths.

Now referring to FIG. 5, boards transported by conveyor 408 are received by lug sweep 500. Lug sweep 500 is coupled by network cable 502 to control computer 206. Based upon control signals received from control computer 206, lug sweep 500 will allow longer boards (e.g., those used to form bottom chords or upper chords of a truss) to continue being conveyed to the left to long board roller sweep 504 which then transports such boards in parallel orientation onto long board stack area 506. On the other hand, if the finger-jointed material received by lug sweep 500 is destined to be used to form a web or post component of a truss, then the control signals received by lug sweep 500 via network cable 502 direct lug sweep 500 to transport such received material onto conveyor 508 in parallel orientation.

If desired, boards conveyed by conveyor 508 may be transferred onto a paternoster lift which alternately raises and lowers a large number of incoming boards, assuring a ready supply of boards for feeding to optisaw 512. Optisaw 512 is coupled to control computer 206 by network cable 514, and under the direction of control computer 206, optisaw 512 cuts incoming wooden members into precise lengths, or web member blanks, generally corresponding to webs or posts called for by the truss batch list. It will be noted that the incoming wooden members provided to optisaw 512 were already cut once by flying cutoff saw 404 (see FIG. 4). These web member blanks produced by optisaw 512 are not final because they have ends that are cut perpendicular to the length of the board, and therefore lack the angled cuts on the ends of the board that are needed to properly join each such web or post into an integrated, assembled truss. Optisaw 512 may be used to cut incoming members into two or even three pieces to minimize waste. The web member blanks produced by optisaw 512 are then transported to lineal conveyor Turning now to FIG. 6, the web member blanks transported by conveyor 516 are received by lug sweep sequence deck 600 and transported in parallel orientation to component saw 602. Network cable 604 is coupled to control computer 206 for sending control signals to component saw 602 for cutting required angles on one or both ends of each web member blank received thereby. In many instances, only one angle cut is required on the end of a web member blank, but in some cases, two intersecting angle cuts must be formed on the end of a web member blank to insure that the finished web member (or post) will properly join with the chords, or other web members, in the assembled truss. Waste material cut off by component saw 602 is directed to waste area 606. Finished web/post members produced by component saw 602 are transported to conveyor 608 and conveyed past inkjet printer 610 which labels each passing web/post member with an identification code corresponding to a member specified in the truss batch list. Network cable 609 is coupled to control computer 206 for controlling inkjet printer 610.

Figure 6:
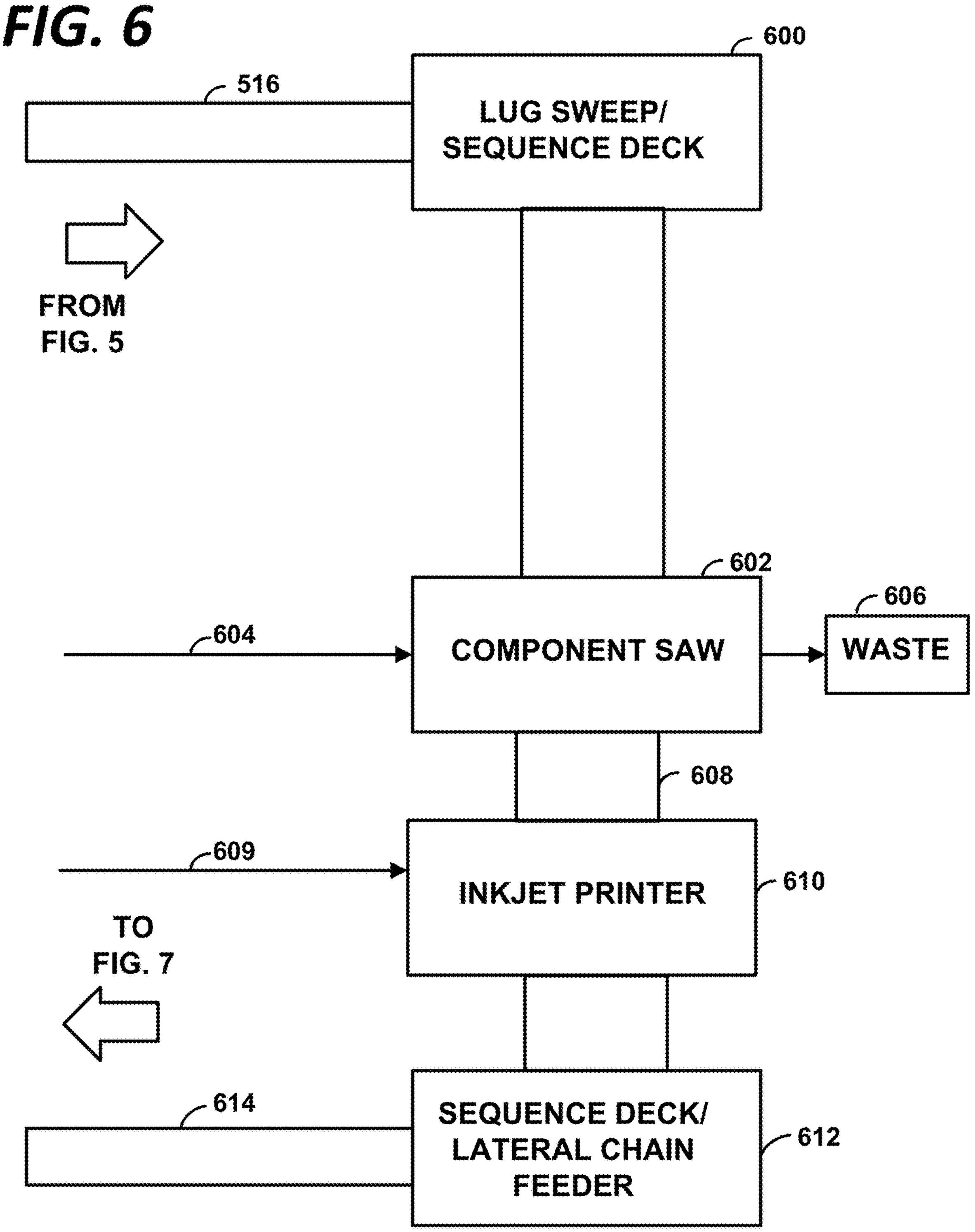
FIG. 6 is a block diagram continued from FIG. 5 and showing a component saw for cutting required angles on the ends of truss component boards, as well as an ink jet printer for labelling truss component boards leaving the component saw.
Figure 7:
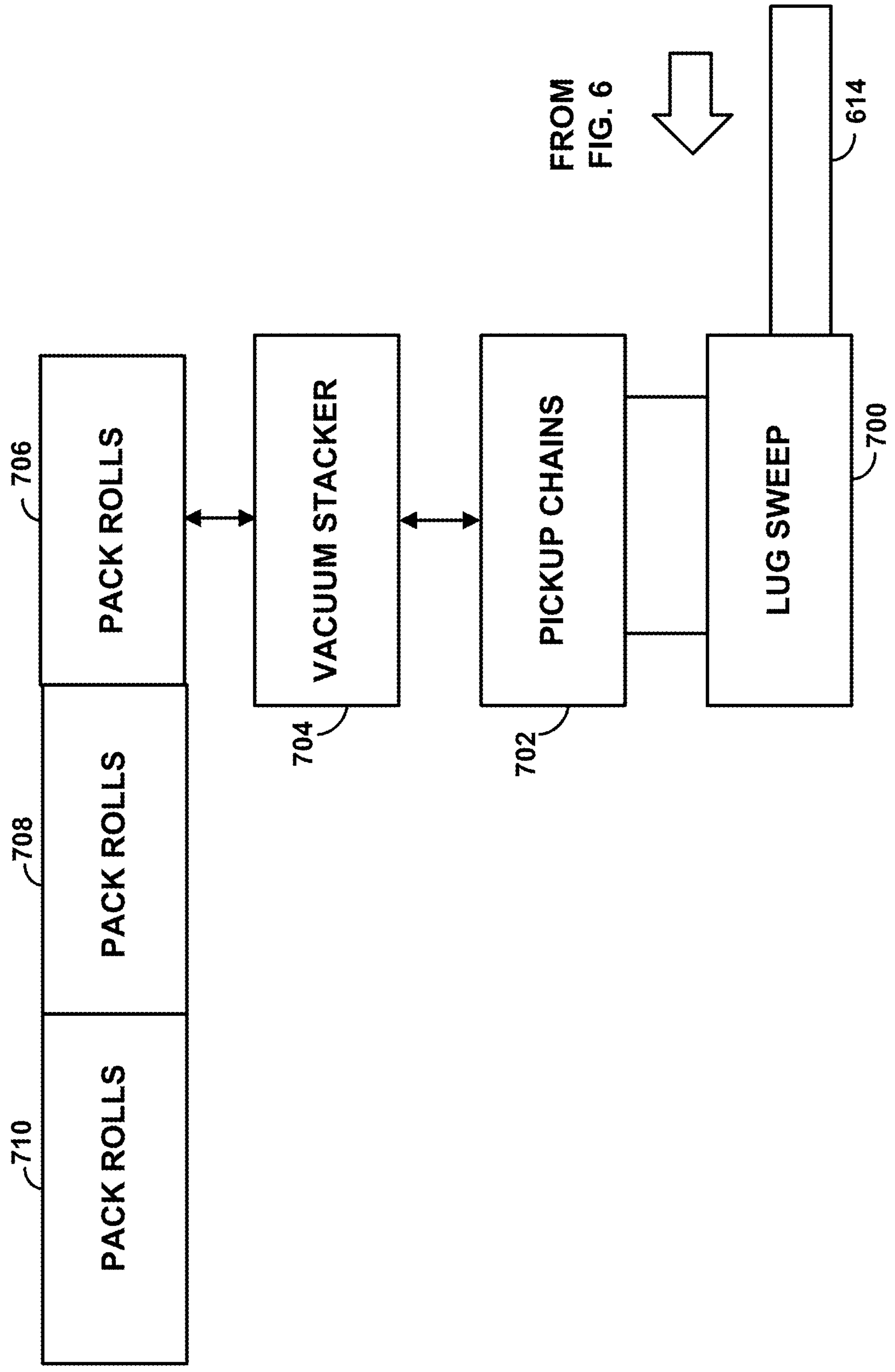
FIG. 7 is a block diagram continued from FIG. 6 and showing how truss component boards leaving the component saw are gathered and stacked into bundles.

Referring to FIGS. 6 and 7, after being labeled by inkjet printer 610, finished web/post members are received by sequence deck/lateral chain feeder 612 and deposited onto lineal conveyor 614 for transport to lug sweep 700. The finished web/post members are moved by lug sweep 700 onto pickup chains 702. A vacuum stacker 704 (similar to vacuum destacker 124 in FIG. 1) moves finished web/post members onto one of several pack rolls 706, 708, 710 for stacking like members together for later use in assembling the various wooden trusses.

Returning to control computer 206 in FIG. 2, it includes a central processor and memory for storing a control program and system data. Control computer 206 also includes an input interface for allowing an operator to input, or otherwise select, a truss batch list. when an operator inputs a desired batch list into control computer 206, it calculates the number of each type of chord, web and post that will be required to assemble all of the various trusses in the batch list. Control computer 206 also calculates the lineal footage of each type of starting material (grade and cross-sectional dimensions) that will be required to produce each of the required chords, webs and posts. Control computer then automatically signals each infeed chute, in the proper sequence, to infeed enough lineal footage of each material grade and type in order to have sufficient stock to produce all of the required components. Control computer tracks the lineal footage deposited by each infeed chute onto conveyor 122. Upon being advised by scanner 202 that a board in transit is going to be rejected, control computer updates its count of lineal footage to deduct the length of the board that is being rejected. Control computer uses information received from scanners 202 and 204 to remove rejected boards, and to control defect saw 222. In addition, control computer uses the batch list information to control flying cutoff saw 404, lug sweep 500, optisaw 512, component saw 602, inkjet printer 610, and vacuum stacker 704.

Figure 8:
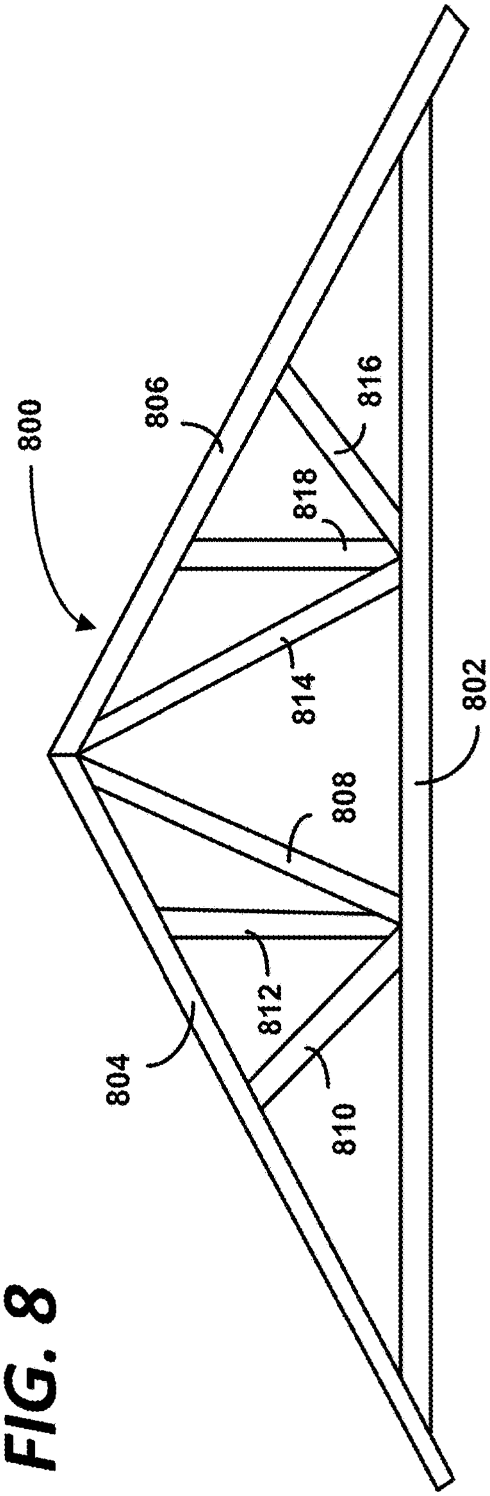
FIG. 8 is a first example of a type of wooden roof truss including a bottom chord, a pair of upper intersecting chords, and a series of interconnecting webs and posts.

FIG. 8 is a plan view of a first example of a roof truss which might be among various roof trusses in a given batch list that need to be generated for a single building to be constructed. Roof truss 800 includes a bottom chord 802 and a pair of opposing upper chords 804 and 806 which intersect at their upper ends at a peak or ridge. The lower ends of upper chords 804 and 806 are fastened to the opposing ends of bottom chord 802. A series of web members 808, 810, 812, 814, 816 and 818 extend from bottom chord 802 to one of the two upper chords 804 or 806 to reinforce truss 800. Vertical web members 812 and 818 are sometimes referred to as "posts". Bottom chord 802 and upper chords 804 and 806 might be formed from wood stock measuring two inches by six inches, whereas web members 808, 810, 812, 814, 816 and 818 might be formed from wood stock measuring two inches by four inches. Lower chord 802 might require wood stock rated SPF2100, while upper chords 804 and 806 might require lesser grade SPF1650. Likewise, web posts 812 and 818 might require wood stock rated SPF2100, while diagonal web members 808, 810, 814 and 816 might require lesser grade SPF1650, or even SPF #2. The exact cross-sectional dimensions and grade for each such member within truss 800 are specified in the batch list input to control computer 206.

Still referring to FIG. 8, it will be noted that each of the web members 810-818 requires a specific length, and that the ends of each of such web members 810-818 require specific angled cuts in order to join properly with the chord to which such ends are attached. It will be further noted that the bottom end of post member 812 actually require two angled cuts to properly be joined with adjacent diagonal web members 808 and 810. The same is true for the bottom end of post 818 so that it can be properly joined with diagonal web members 814 and 816. The required lengths for web members 810-818 are produced by optisaw 512 (see FIG. 5), and the required angled cuts are all formed by component saw 602 (see FIG. 6).

Figure 9:
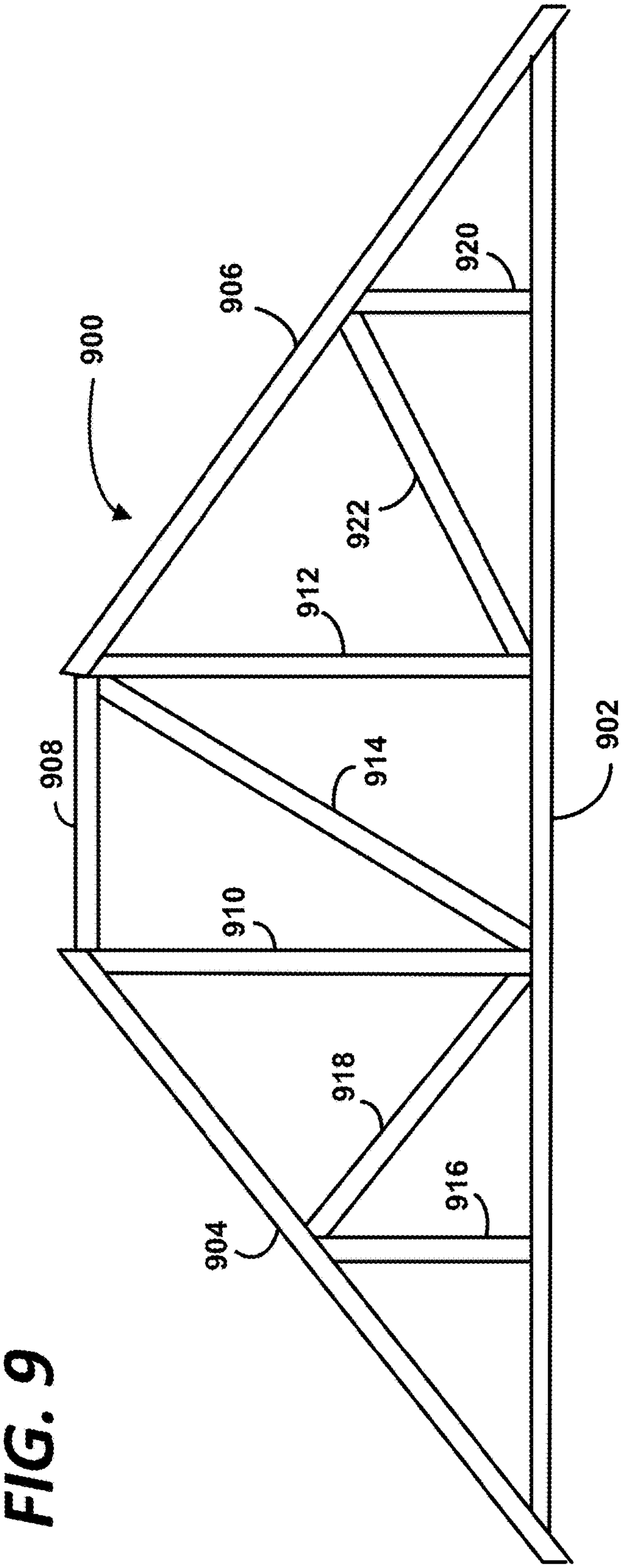
FIG. 9 is a second example of a different type of wooden roof truss.

FIG. 9 shows a second example of a different roof truss 900 that might be required to form a portion of the roof in the same building in which truss 800 of FIG. 8 is used. Truss 900 includes a bottom chord 902, two opposing side chords 904 and 906, and an upper horizontal chord 908 extending between the upper ends of side chords 904 and 906. Vertical post 910 extends from bottom chord 902 up to the intersection of side chord 904 with upper chord 908, and vertical post 912 extends from bottom chord 902 up to the intersection of side chord 906 with upper chord 908. Diagonal web member 914 extends from the bottom of post 910 to the top of post 912. Vertical post 916 extends from bottom chord 902 to a central location along side chord 904, and diagonal web member 918 extends from the base of post 910 to the intersection of post 916 with side chord 904. Likewise, vertical post 920 extends from bottom chord 902 to a central location along side chord 906, and diagonal web member 922 extends from the base of post 912 to the intersection of post 920 with side chord 906. As in the case of truss 800 of FIG. 8, the various chords and web members that make up the components of truss 900 may each have different cross-sectional dimensions and/or grade requirements, each of which is called out in the batch list for a particular building. Also, as was true for the web/post members of truss 800, the upper ends of the various posts 910, 912, 916 and 920, and both ends of web members 914, 918 and 922, each have specific angle requirements in order to allow roof truss 900 to be assembled properly. Once again, optisaw 512 may be used to produce the web blanks for forming the shorter web members 916, 918, 920, and 922, and component saw 602 is used to cut the angles on the ends of web/post members 910-922.

Figure 10:
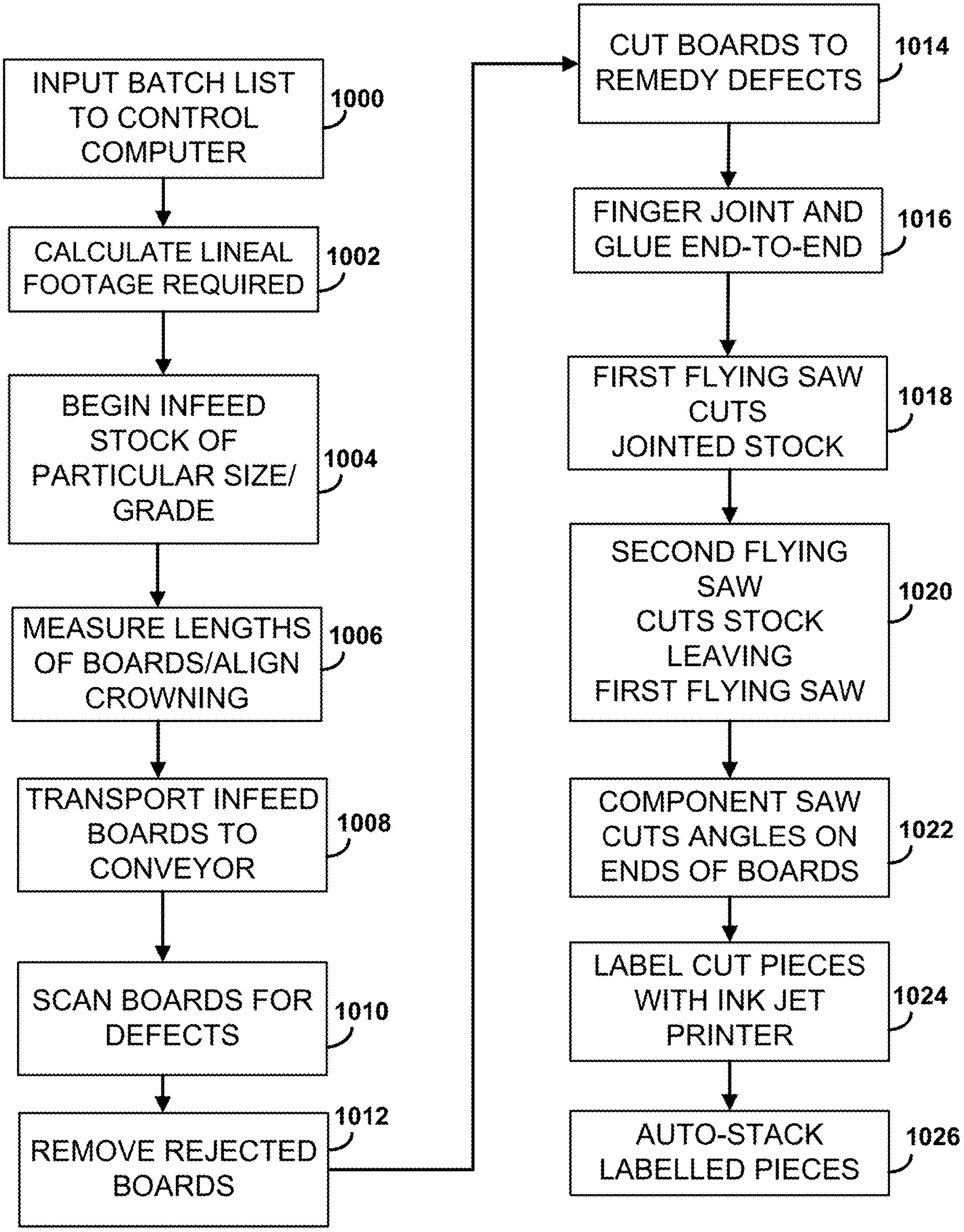
FIG. 10 is a simplified flow chart graphically illustrating a method for producing wooden truss components in accordance with an embodiment of the present invention.

As already noted, a single batch list for a single building might include as many as 50 different roof truss configurations, each including its own combination of chords, webs and posts. All of these chord, web and post components are specified within a given batch list for a given building. Now referring to FIG. 10, a simplified flow chart is provided for explaining the method by which all of such chord, web and post components can be produced using the apparatus described in FIGS. 1-7 above. Step 1000 in FIG. 10 is the initial step wherein an operator inputs the batch list to control computer 206. This may involve actually feeding in a complete listing of all of the components for all of the trusses for a particular building, or if such batch list has previously been stored in control computer 206, then the operator simply selects the desired batch list from among a number of previously saved batch lists. As indicated by step 1002, control computer 1002 then calculates the lineal footage of wood stock required for each type of wood stock stored in infeed chutes 102-110 (see FIG. 1). Thus, control computer 206 calculates the lineal footage requirement for 2×6 SPF2100 boards; the lineal footage for 2×6 SPF1650 boards; the lineal footage for 2×4 SPF2100 boards; the lineal footage for 2×4 SPF1650 boards; and the lineal footage for 2×4 SPF #2 boards.

At step 1004, control computer causes infeed chute to begin infeeding 2×6 SPF2100 boards onto conveyor 122 for at least until the total lineal footage of 2×6 SPF2100 boards has reached the computed amount required. As represented by step 106, the lineal length of each board delivered by infeed chute 102 to conveyor 122 is measured and fed to control computer 206, allowing control computer 206 to continuously track and compare the total lineal footage delivered by infeed chute 102 to the lineal footage requirements computed in step 1002. Control computer allows infeed chute 102 to keep depositing boards onto conveyor 122 at least until the total lineal footage deposited matches the computed lineal footage that is required by the batch. Step 106 also indicates that boards that are crowned in the wrong direction are flipped before being delivered to conveyor 122 in step 1008. As already noted, for a given cross-sectional dimension of wood stock, control computer starts with the highest grade stock and ends with the lowest grade stock; this ensures that any wood stock in progress will always have at least as high a grade as that required for a given web member in the batch list.

Still referring to FIG. 10, step 1010 represents the scanning operations performed by scanners 202 and 204 (see FIG. 2). At step 1012, boards that fail to meet required specifications (either because they have excessive moisture or excessive curvature/crowning) are removed, or extracted, while allowing conforming boards to pass to step 1014 where defects (including knots detected adjacent the end of a board, or boards having pronounced crowning) are removed (either by cutting the end of the board to removed a knot, or cutting a longer board into two or three shorter boards to reduce the effect of crowning). Boards removed at step 1012 are noted by the control computer for deducting the lineal footage of each such rejected board from the total lineal footage delivered by the corresponding infeed chute.

Step 1016 in FIG. 10 is the finger-jointing operation in which the ends of incoming boards are grooved, glued, and crowded to form a continuous outgoing stream of finger-jointed stock. At step 1018, the continuous stream of finger-jointed stock is cut by first flying saw 1018 into a desired length, depending on whether such cut member is destined to become a bottom chord or upper chord that will bypass the component saw, for example, or whether such cut member is destined to become a web member or post member. If such cut member is destined to become a web member or post member, control passes to step 1020 where optisaw 512 (which may be a second flying saw, if desired) cuts such members into lengths suitable for forming web blanks to be processed by the component saw 602. Control then passes to step 1022 wherein the web blanks produced by optisaw 512 are finished by cutting required angles on the ends of such web blanks. Finished web components preferably pass through an inkjet printer, as represented by step 1024, for labelling before being stacked at step 1026.

Figures 11A, 11B:
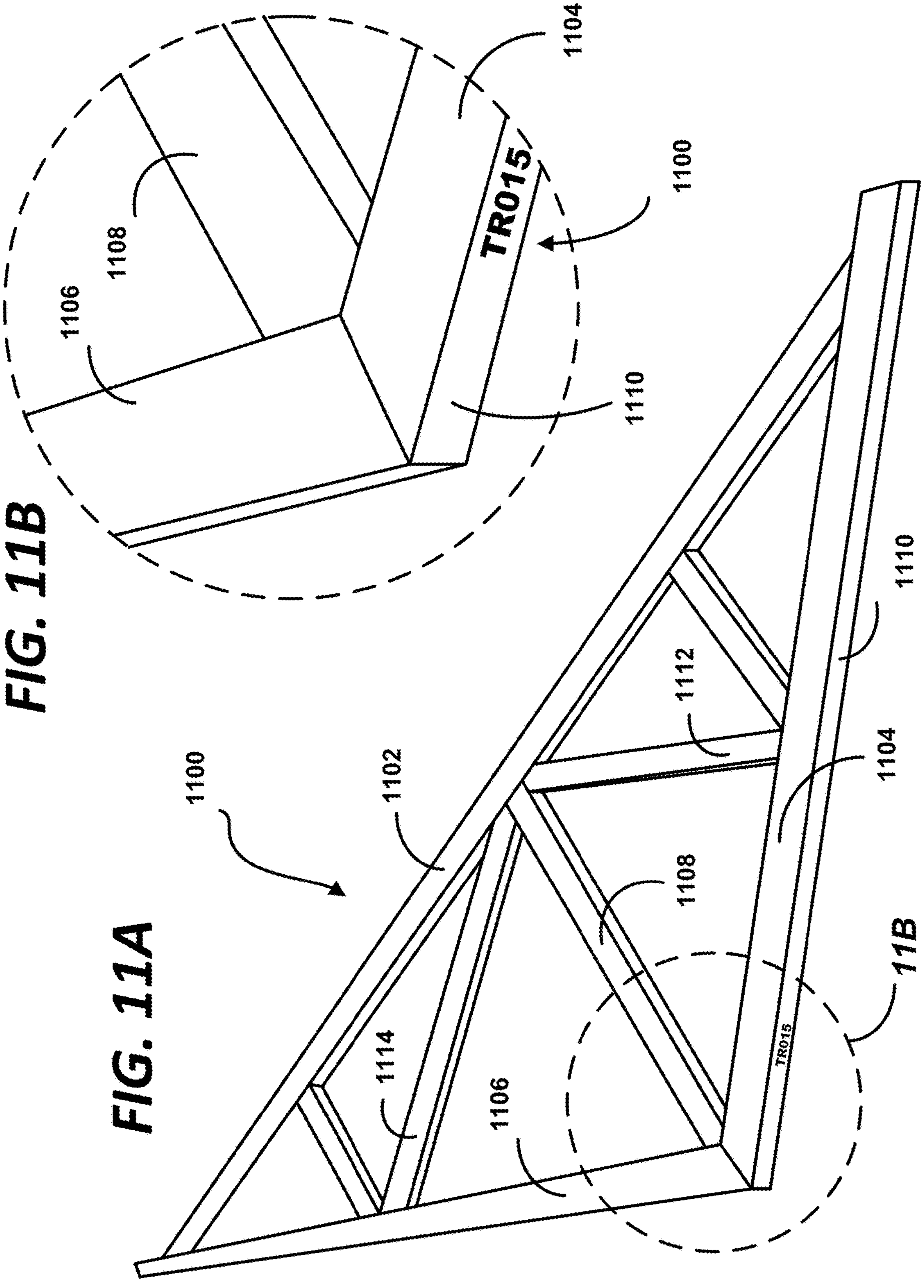
FIG. 11A is a perspective drawing of a wooden roof truss.
FIG. 11B is a close-up view of the region surrounding the peak of the roof truss shown in FIG. 11A and showing identifying information printed on the edge of one of the upper chords to identify the completed truss assembly.

Now referring to FIG. 11A, wooden roof truss assembly 1100 includes an elongated bottom chord 1102, a pair of upper chords 1104 and 1106, and a series of posts and webs including central post 1108 and webs 1112 and 1114. As discussed above, chords 1102, 1104 and 1106 may typically have cross-sectional dimensions measuring approximately 2 inches by 6 inches, while the interconnecting posts and webs may have cross-sectional dimensions measuring either approximately 2 inches by 6 inches or 2 inches by 4 inches. In the description that follows, the surfaces having a width of approximately 2 inches are referred to as "edges", while the surfaces having a width of approximately 6 inches, or 4 inches, are referred to as "faces". In the view shown in FIG. 11A, the "faces" of the various chords, posts and webs lie horizontally and face upward, while the smaller-dimensioned "edges" of the various chords, posts and webs extend vertically and face sideward.

It was explained above in regard to FIG. 6 that members produced by component saw 602 can be transported to conveyor 608 and conveyed past inkjet printer 610 which labels each passing member with an identification code corresponding to a member specified in the truss batch list. Those labels are typically printed on the faces (i.e., the larger-dimensioned surfaces) of the members passing inkjet printer 610. While such component information is helpful in identifying each wooden member as a component within a particular type of truss, that information does not identify a completed truss assembly. In addition, information printed on the faces of wooden members is often covered over when assembled trusses are stacked against each other for shipping. In addition, any information printed on the faces of such chords, posts, or webs cannot be viewed easily after a wooden truss is positioned in a building under construction, either by an observer located on the ground below roof trusses, or by an observer located atop a roof under construction.

Accordingly, as shown in FIGS. 11A and 11B, an assembled truss identifier is printed on outward edge 1110 of upper chord 1104 to identify a particular model of assembled roof truss. In this example, the truss identifier is "TR015", which is printed a fixed distance (e.g., 12-24 inches) from the peak of roof truss 1100.

Figure 12:
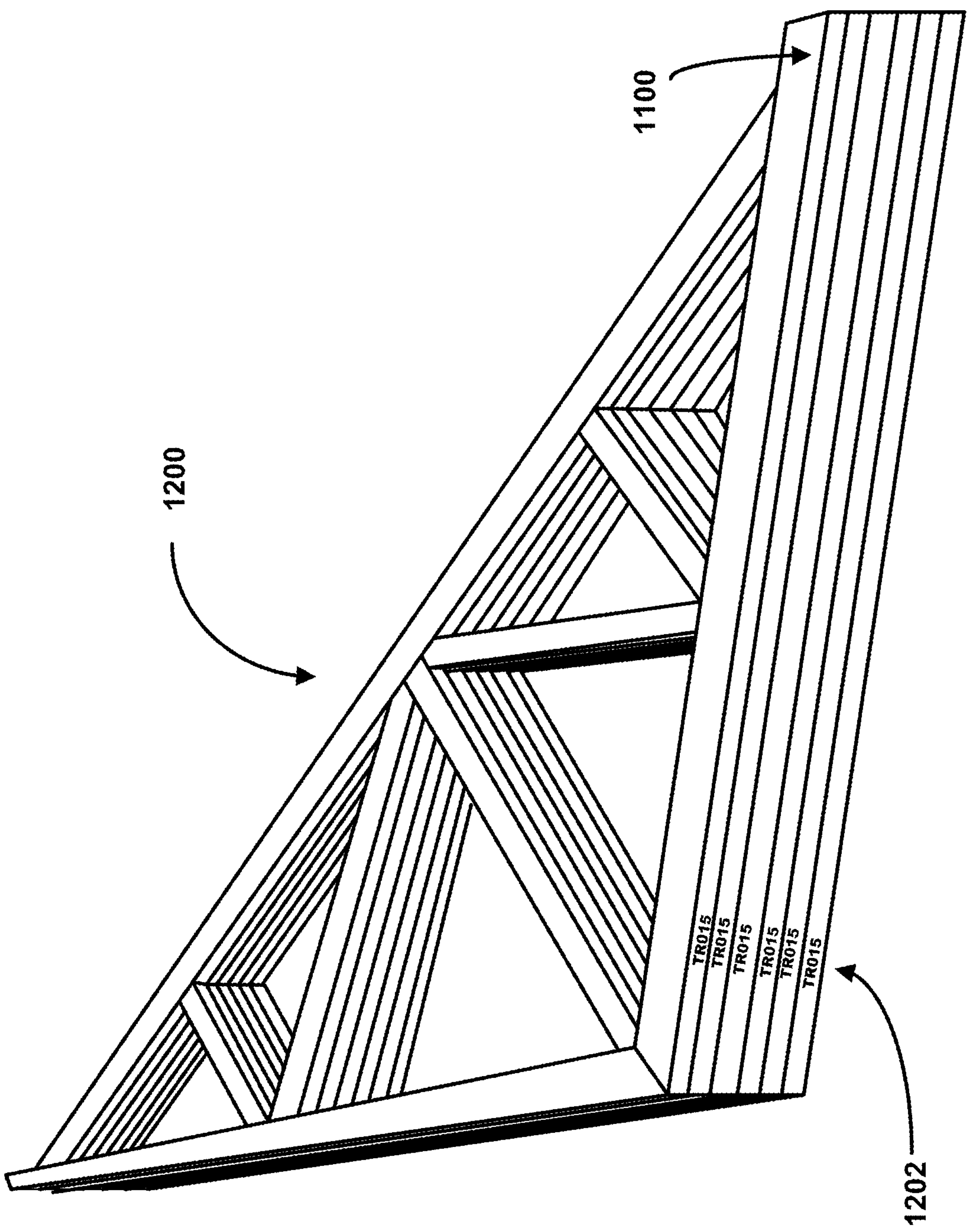
FIG. 12 is a perspective view of a stack of wooden truss members of the same configuration shown in FIG. 11A, each including assembled truss identifying information printed on the edge of one of the upper chords of each truss assembly in the same relative location.

In FIG. 12, a stack 1200 of six such roof trusses 1100 is shown. As can be seen, the truss identifier "TR015" is printed on the upper chord of each such roof truss 1100 at the same distance from the peak of each such roof truss, forming a row of truss identifiers that can easily be observed when such trusses are loaded for transport at the manufacturing plant, or when being unloaded at the construction site. The fact that the roof trusses have been stacked together does not obstruct viewing of the assembled truss identifier printed on each such assembled roof truss.

Figures 13A, 13B:
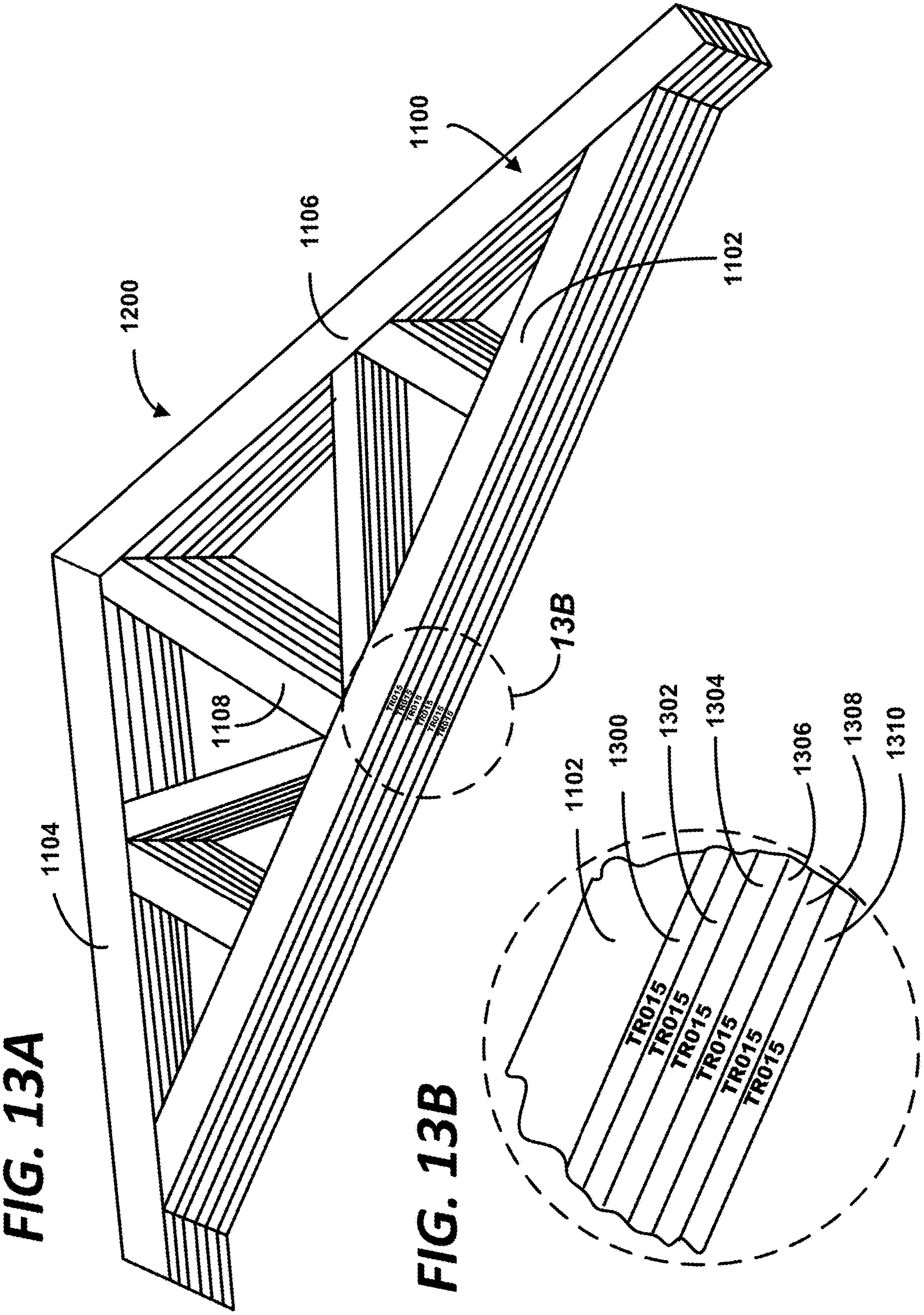
FIG. 13A is another perspective view of the stack of wooden truss members shown in FIG. 12, but from a different angle, and showing a row of identifying information printed on the bottom chord of each assembled truss to identify the completed truss assembly.
FIG. 13B is a close-up view of the regions of the bottom chords of the stack of assembled roof trusses shown in FIG. 13A and showing the row of identifying information printed on the edges of such bottom chords.

In FIG. 13A, the stack 1200 of roof trusses shown in FIG. 12 is again shown, but stack 1200 has been rotated 180 degrees to reveal the bottom chords (1102) of such assembled roof trusses. As can be seen more easily in the close-up view of FIG. 13B, the assembled truss identifier TR015 has also been printed on the outwardly facing edges of the bottom chords (1102) of each assembled roof truss 1100. In this example, the truss identifier TR015 is printed at approximately the midpoint of each such bottom chord. Accordingly, the truss identifying labels form a compact row of truss identifiers when such assembled roof trusses are stacked together for storage or transport.

Figure 14:
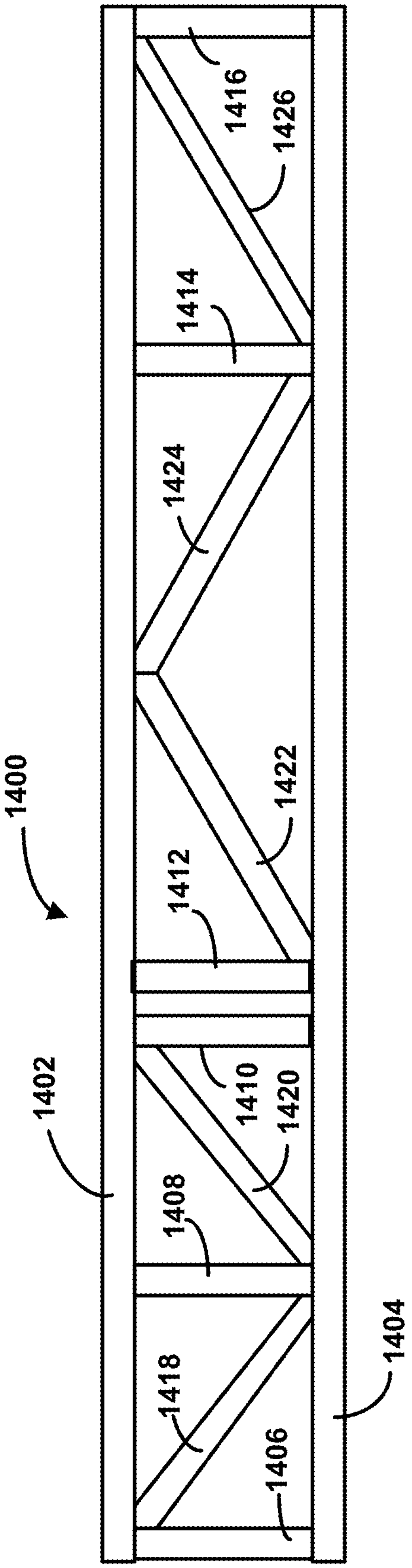
FIG. 14 is a frontal view of an elongated wooden floor truss.

While FIGS. 11-13 are directed to the labelling of wooden roof trusses, the same concept can also be applied to floor trusses (also known as floor panels) and wall panels. In FIG. 14, a wooden floor truss 1400 is shown. Floor truss 1400 includes an upper elongated chord 1402 and an elongated lower chord 1404, along with interconnecting posts 1406, 1408, 1410, 1412, 1414 and 1416, and diagonal webs 1418, 1420, 1422, 1424 and 1426. Such floor trusses are often used to support floors between levels of multi-level buildings. It should be understood that the term “truss” as used herein can refer to a roof truss, a floor truss, or even a wall panel.

Figure 15A:
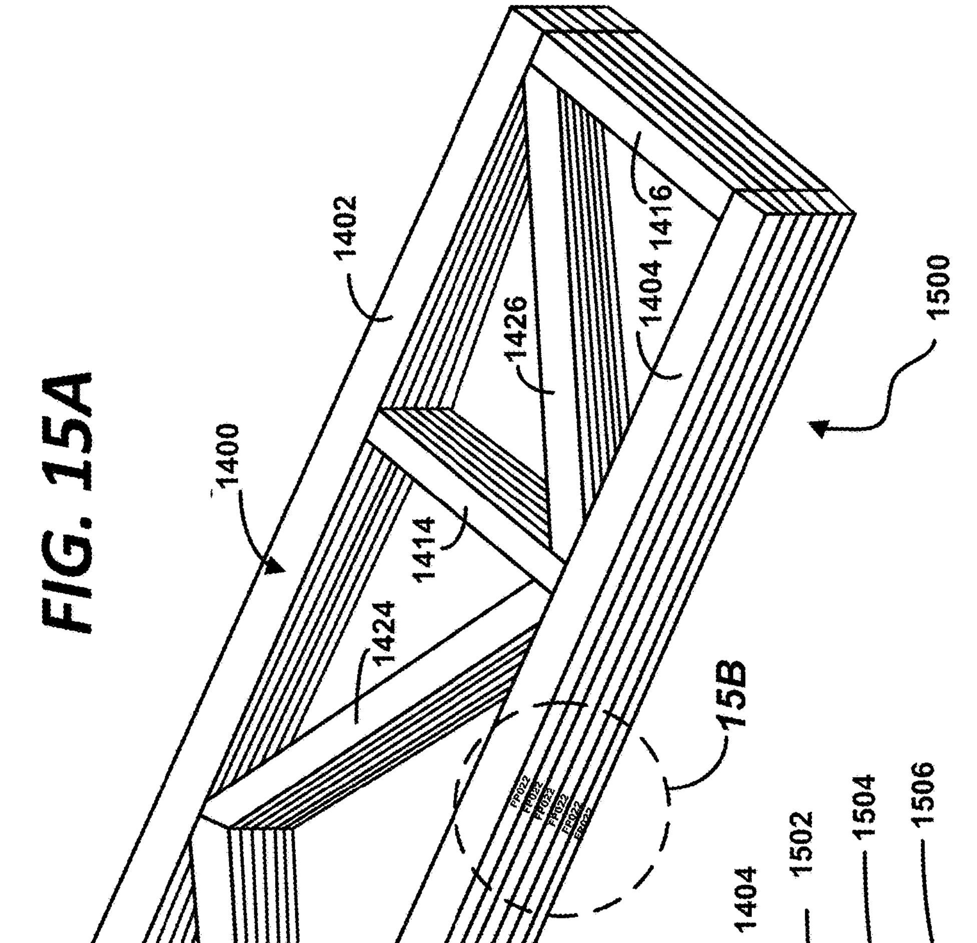
FIG. 15A is a partial perspective view of a stack of wooden floor trusses of the same configuration shown in FIG. 14, each including assembled truss identifying information printed on an edge of the bottom chord of each floor truss assembly in the same relative location.
Figure 15B:
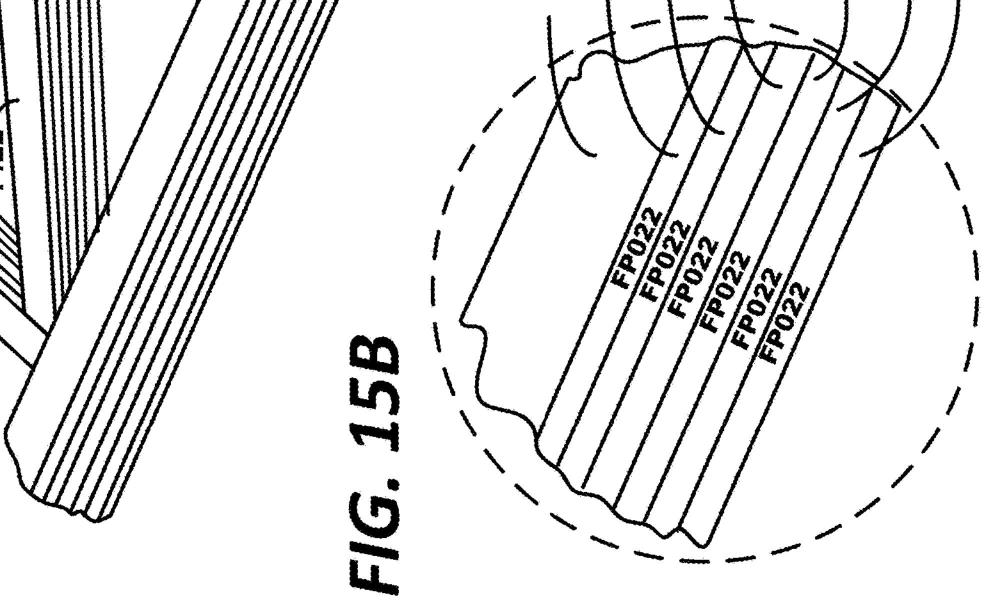
FIG. 15B is a close-up view of the regions of the bottom chords of the stack of assembled floor trusses shown in FIG. 15A and showing the row of identifying information printed on the edges of such bottom chords.

In the partial perspective view of FIG. 15A, a stack 1500 of floor panels 1400 is shown. As shown, floor panel identifier information (“FP022”) has been printed on the outward facing edge of the bottom chord 1404 of each such floor panel 1400. As shown best in the close-up view of FIG. 15B, the truss identifier label FP022 has been printed in the same relative location on the lower edge of each such bottom chord to form a compact row of truss identifiers when such floor panels are stacked against each other. Each such truss identifier label has been printed at approximately the same distance from the rightmost end of each bottom chord.

Figure 16:
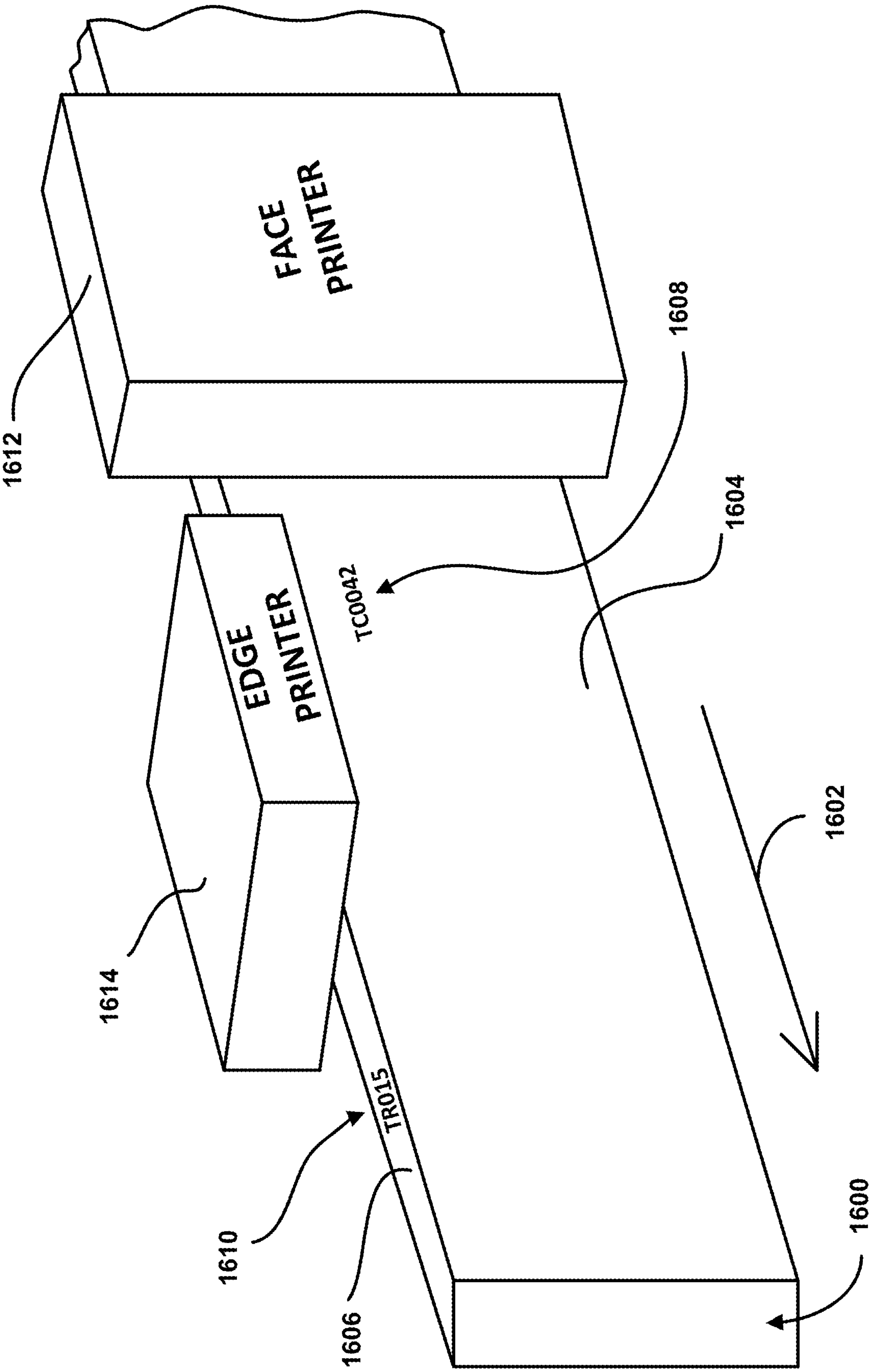
FIG. 16 is a perspective view of a cut wooden member being conveyed past a face printer and an edge printer.

Referring now to FIG. 16, a wooden member 1600 cut by a component saw (for example, component saw 602 of FIG. 6), is passed by a conveyor in the direction indicated by arrow 1602. Incoming wooden member 1600 includes two opposing broader faces, including face 1604, extending generally in a vertical plane, as well as two opposing narrower edges, including upper edge 1606, extending generally in a horizontal plane. A first inkjet printer 1612, or face printer, is disposed along the conveyor parallel to face 1604 of wooden member 1600 for printing a component identifier on the face of wooden member 1600; in this case, the component identifier “TC0042” is printed at location 1608 to identify this particular component which will be used to form a chord, post or web within one or more models of a truss or panel. A second inkjet printer 1614, or edge printer, is disposed above the conveyor parallel to edge 1606 of wooden member 1600 for printing a truss (or panel) identifier on the edge of wooden member 1600; in this case, wooden member 1600 happens to be an upper chord of a roof truss, and the truss identifier “TR015” is printed at location 1610 at a predetermined distance from the leading end of wooden member 1600 to eventually identify an assembled roof truss using this upper chord as being of type TR015. In the embodiment shown in FIG. 16, face printer 1612 and edge printer 1614 are oriented perpendicular to each other.

Still referring to FIG. 16, wooden members being conveyed past face printer 1612 and edge printer 1614 may typically be moving at a relatively high rate of speed, e.g., in the range of 3-10 lineal feet per second. Accordingly, face printer 1612 and edge printer 1614 should be of a type capable of printing quickly on lumber. Suitable printers that can serve as face printer 1612 and edge printer 1614 are commercially available from, for example, from Rea Jet US of Walton Hills, Ohio, the North America subsidiary of REA Elektronik GmbH of Germany.

Figure 17:
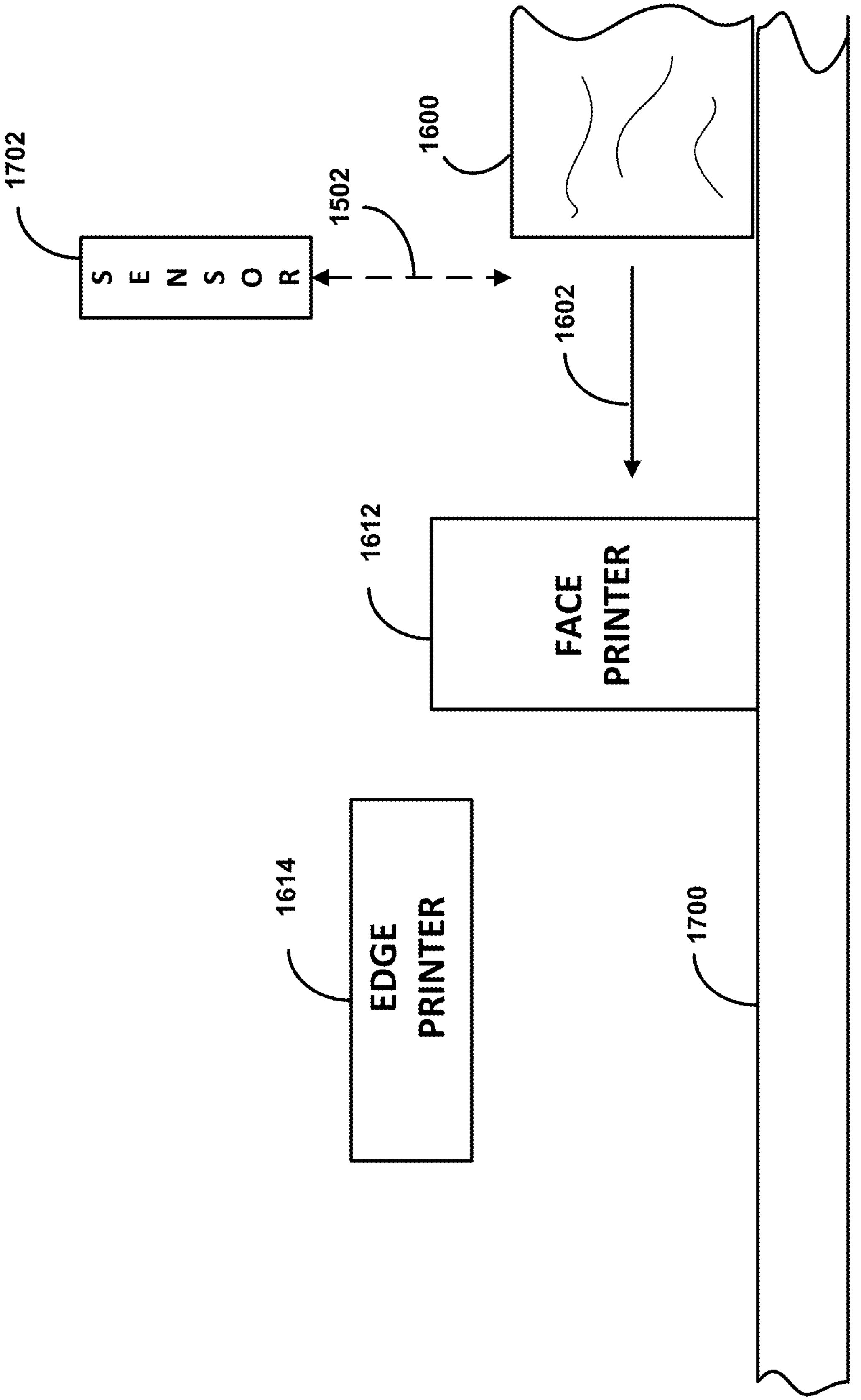
FIG. 17 is a side view of the components shown in FIG. 16 and including a sensor detecting the incoming forwardmost end of a cut wooden member.

FIG. 17 shows the components of FIG. 16 from the side. Conveyor 1700 is used to transport cut wooden member 1600 in the direction indicated by arrow 1602. Face printer 1612 is disposed along conveyor 1700 and is coupled to control computer 206 (see FIG. 2) for printing identifying component information (e.g., “TC0042”) upon a faces wooden member 1600 in response to control signals received from control computer 206. Again, such identifying component information indicates a particular component within a wooden truss or panel structure that includes such component. Edge printer 1614 is also disposed along conveyor 1700 and is also coupled to control computer 206; edge printer 1614 is configured to print identifying assembled truss (or panel) information (e.g., :TR015") upon the upwardly-directed edge of selected wooden members (e.g., wooden member 1600) in response to control signals received from control computer 206. These selected wooden members are typically either the bottom chord of a roof truss, one of the upper chords of a roof truss, or one of the upper or lower elongated chords of a floor truss or wall panel. The identifying assembled truss information (e.g., “TR015”) serves to identify a particular assembled wooden truss or panel after it has been assembled.

Still referring to FIG. 17, a sensor 1702 is also disposed along conveyor 1700 upstream from face printer 1612 and edge printer 1614. Sensor 1702 serves to detect the presence of the forwardmost edge of incoming wooden member 1600. Sensor 1702 is electrically coupled to control computer 206 and provides thereto a detection signal to synchronize printing by face printer 1612, and to synchronize printing by edge printer 1614. Control computer 206 is aware of the speed of conveyor 1700, and since control computer 206 is triggered by sensor 1702 upon the arrival of the forwardmost edge of incoming wooden member 1600, control computer 206 can compute the precise moment when face printer 1612 should “fire” to print the component identifier on the face of wooden member 1600. Likewise, control computer 206 can compute the precise moment when edge printer 1614 should “fire” (in the case of a chord requiring the printing of a truss/panel edge identifier) to print the truss/panel identifier at a desired position along such chord (e.g., three feet in from the leading edge of each upper chord).

It will be appreciated that the elongated chords of the type shown as chords 1402 and 1404 within floor truss 1400 of FIG. 14 may be in excess of 20 feet in length. When producing such elongated chords, the wooden members 1402 and 1404 bypass component saw 602 of FIG. 6. These elongated chords do not require angled cuts; after being discharged from the finger jointer, they may be cut (as by flying cutoff saw of FIG. 4) to their final length and transported for stacking along a separate conveyor. In this case, a face printer and edge printer may be disposed along such separate conveyor for allowing both component identifiers and assembled truss identifiers to be printed on the faces and edges, respectively, of such elongated chords.

It will be appreciated that a novel method has also been described to print identifying information on components of wooden trusses and panels, and to print information identifying assembled wooden trusses and/or panels. The method includes providing a control computer 206 having a processor and a memory for storing a control program. An operator interfaces with the control computer to select a batch list which identifies each chord, post and/or web member included in each of the plurality of wooden trusses or panels.

The method includes providing a first conveyor (e.g., conveyor 122 of FIG. 1) for transporting wooden members therealong, and providing at least one infeed chute (e.g., 102 in FIG. 1) in which wooden members are stored. Wooden members are transferred from the at least one infeed chute to the first conveyor in response to control signals received from the control computer. Wooden members are conveyed to the inlet of a finger-jointer (see FIGS. 3 and 4) for joining wooden members received thereby end-to-end, the finger-jointer discharging a continuous length of joined wood at its outlet. The continuous length of joined wood is discharged from the outlet of the finger-jointer to at least one saw (e.g., cutoff saw 404 of FIG. 4 or component saw 602 of FIG. 6), and cutting joined wood discharged from the outlet of the finger-jointer into lengths of cut wooden members in response to control signals received from the control computer. The method includes transporting cut wooden members along a second conveyor, as well as providing a face printer and an edge printer each disposed along the second conveyor. The face printer prints identifying component information upon one of the faces of each cut wooden member in response to control signals received from the control computer, wherein the identifying component information indicates a particular component within a wooden truss or panel structure. The edge printer prints identifying assembled truss/panel information upon one of the edges of selected cut wooden members in response to control signals received from the control computer, wherein the identifying assembled truss/panel information indicates a particular assembled wooden truss or panel.

The foregoing method may also include detecting that the forwardmost end of a cut wooden member conveyed by the second conveyor is approaching the face printer and the edge printer, and providing a detection signal to the control computer signaling that the forwardmost end of a cut wooden member conveyed by the second conveyor is approaching the face printer and the edge printer. The control computer is used to synchronize printing by the face printer and to synchronize printing by the edge printer, whereby the correct identification information is printed on each wooden member. In at least one such embodiment of such method, the identifying assembled truss/panel information is printed upon an edge of each selected cut wooden member at approximately the same distance from the forwardmost end of each selected cut wooden member. In this manner, when a plurality of assembled wooden trusses or panels are stacked together, the identifying assembled truss/panel information printed on such plurality of assembled wooden trusses/panels lies substantially along a common row. In at lease one embodiment of such method, the face printer and the edge printer are oriented perpendicular to each other.

Those skilled in the art should now appreciate that the present invention provides an improved apparatus and method for manufacturing wooden components used to construct wooden roof trusses, wooden floor trusses or wooden wall panels in an automatic, efficient, reliable, and economical manner, minimizing the need for manual labor. No visual inspection of wooden boards, nor manual marking of wooden boards, nor flipping of wooden boards, is required by a human operator, and the infeeding of wooden boards is entirely automated. Defects in wooden boards are detected automatically without the need to rely on human operators, and to the extent that defects can be corrected, such corrections are carried out automatically without slowing the advance of non-defective boards. In addition, identifying information can be printed on components of wooden trusses and panels, and information identifying assembled wooden trusses and/or panels can be printed on outer chords of such assemblies by transporting cut wooden members along a conveyor provided with a face printer and an edge printer. The face printer prints identifying component information upon one of the faces of each cut wooden member, and an edge printer applies identifying assembled truss/panel information upon one of the edges of selected cut wooden members. to identify a particular assembled wooden truss or panel. A sensor communicating with a control computer synchronizes printing by the face printer and edge printer. The identifying assembled truss/panel information is easily visible even when a number of trusses or panels are stacked together.

The embodiments specifically illustrated and/or described herein are provided merely to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

What is claimed is:

1. A method of printing identifying information on components of wooden trusses and printing information identifying assembled wooden trusses, each of said wooden trusses including at least first and second chords and a plurality of web members for extending between the at least first and second chords, each of the at least first and second chords and each of the plurality of web members having a pair of opposing faces and a pair of opposing edges, the pair of opposing faces each having a first width, the pair of opposing edges each having a second width, wherein the first width is greater than the second width, the method comprising:

a) providing a control computer having a processor and a memory for storing a control program, the control computer including an input interface for receiving a batch list selected by an operator, the batch list identifying each chord and each web member included in each of the plurality of wooden trusses, the control computer generating a plurality of control signals;

b) providing a first conveyor for transporting wooden members therealong;

c) providing at least one infeed chute in which wooden members are stored;

d) transferring wooden members from the at least one infeed chute to the first conveyor in response to control signals received from the control computer;

e) providing a finger-jointer having an inlet and an outlet, the inlet of the finger jointer receiving wooden members transported by the first conveyor, the finger-jointer serving to join wooden members received thereby end-to-end, the finger-jointer discharging a continuous length of joined wood at its outlet;

f) conveying the continuous length of joined wood discharged from the outlet of the finger-jointer to at least one saw, and cutting joined wood discharged from the outlet of the finger-jointer into lengths of cut wooden members in response to control signals received from the control computer;

g) transporting cut wooden members along a second conveyor;

h) providing a face printer disposed along the second conveyor for printing identifying component information upon one of the faces of each cut wooden member in response to control signals received from the control computer, the identifying component information indicating a particular component within a wooden truss structure; and i) providing an edge printer disposed along the second conveyor for printing identifying assembled truss information upon an outward facing edge of one of the at least first and second chords in response to control signals received from the control computer, the identifying assembled truss information indicating a particular assembled wooden truss.

2. The method of claim 1 including:

a) detecting that the forwardmost end of a cut wooden member conveyed by the second conveyor is approaching the face printer and the edge printer;

b) providing a detection signal to the control computer signaling that the forwardmost end of a cut wooden member conveyed by the second conveyor is approaching the face printer and the edge printer; and c) using the control computer to synchronize printing by the face printer and to synchronize printing by the edge printer.

3. The method of claim 2 wherein the identifying assembled truss information is printed upon an outward facing edge of one of the at least first and second chords at approximately the same distance from the forwardmost end of each such chord whereby, when a plurality of assembled wooden trusses are stacked together, the identifying assembled truss information printed on such plurality of assembled wooden trusses lies substantially along a common row.

4. The method of claim 1 including orienting the face printer and the edge printer perpendicular to each other.

* * * * *